United States Patent [19]

Darty et al.

[11] Patent Number: 5,752,047
[45] Date of Patent: May 12, 1998

[54] MODULAR SOLID STATE POWER CONTROLLER WITH MICROCONTROLLER

[75] Inventors: Mark Anthony Darty, Madison; Guy Brent Prickett, Grant; Charles Raymond Schwarz, Huntsville, all of Ala.

[73] Assignee: McDonnell Douglas Corporation, Huntington Beach, Calif.

[21] Appl. No.: 893,304

[22] Filed: Jul. 15, 1997

Related U.S. Application Data

[63] Continuation of Ser. No. 513,714, Aug. 11, 1995, abandoned.

[51] Int. Cl.$^6$ .................................................. G06F 1/26
[52] U.S. Cl. ............................ 395/750.01; 395/750.02; 361/2
[58] Field of Search .......................... 395/750.01, 750.02; 361/57, 79, 2

[56] References Cited

U.S. PATENT DOCUMENTS

| | | | |
|---|---|---|---|
| 4,106,013 | 8/1978 | Cronin | 340/27 R |
| 4,110,809 | 8/1978 | Cronin | 361/95 |
| 4,143,410 | 3/1979 | Cronin | 361/93 |
| 4,174,496 | 11/1979 | McFall et al. | 323/9 |
| 4,363,064 | 12/1982 | Billings et al. | 361/57 |
| 4,498,119 | 2/1985 | Cronin | 361/386 |
| 4,637,011 | 1/1987 | Crabbe, Jr. | |
| 4,675,803 | 6/1987 | Kendall et al. | |
| 4,835,652 | 5/1989 | Billings et al. | 361/79 |
| 4,885,538 | 12/1989 | Hoenniger, III et al. | |
| 5,065,314 | 11/1991 | Maskovyak | |
| 5,274,767 | 12/1993 | Maskovyak | |
| 5,307,463 | 4/1994 | Hyatt et al. | |
| 5,337,310 | 8/1994 | Selyutin | |

*Primary Examiner*—Ayaz R. Sheikh
*Assistant Examiner*—Jeffrey K. Seto
*Attorney, Agent, or Firm*—Bell Seltzer Intellectual Property Law of Alston & Bird

[57] ABSTRACT

An improved modular solid power controller includes low cost low speed microcomputers embedded within the load cards to control a number of semiconductor power switches associated with corresponding electrical load circuits. A master controller microcomputer on the controller card communicates bilaterally with each of such slave microcomputers via a serial data path that extends along the backplane card and interconnects the former computer with each of the load cards, issuing commands in serial form and in high level language that is received by the addressed slave microprocessor, interpreted and acted upon by controlling the semiconductor power switches associated with the respective slave card.

28 Claims, 10 Drawing Sheets

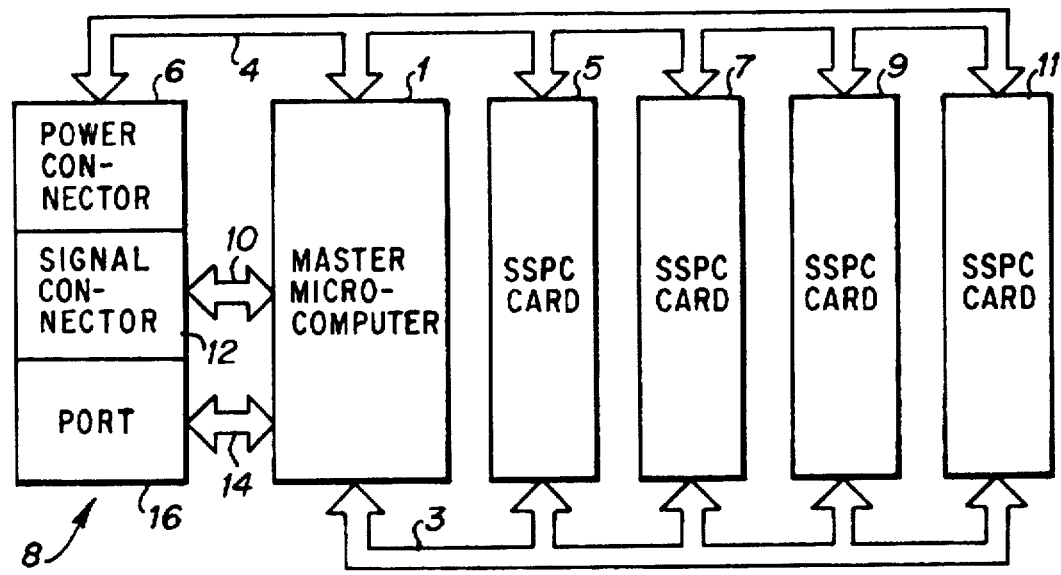
Fig_1
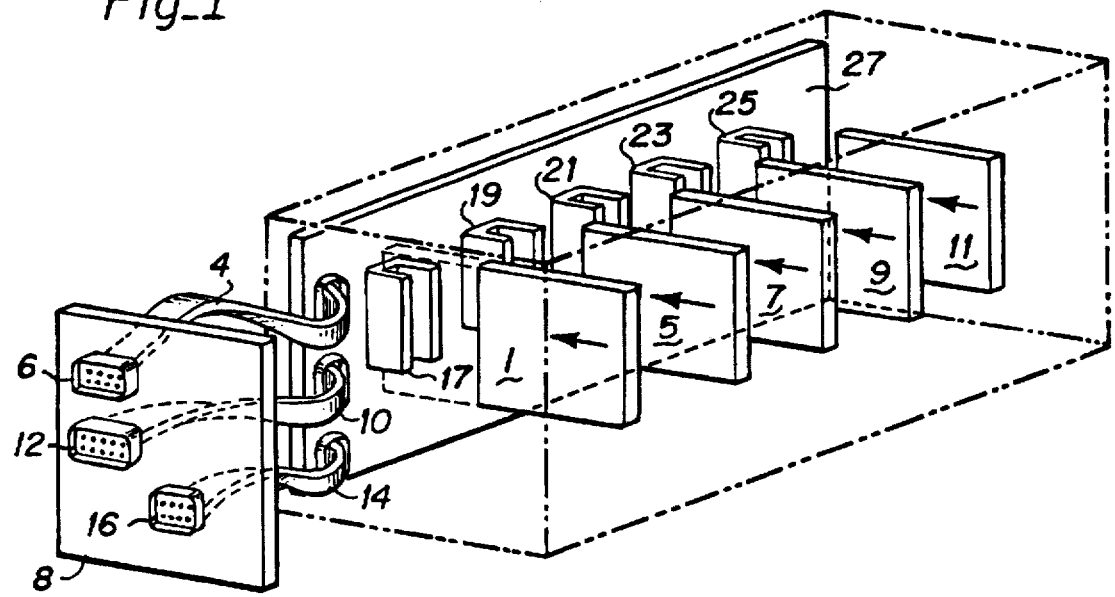
Fig_2

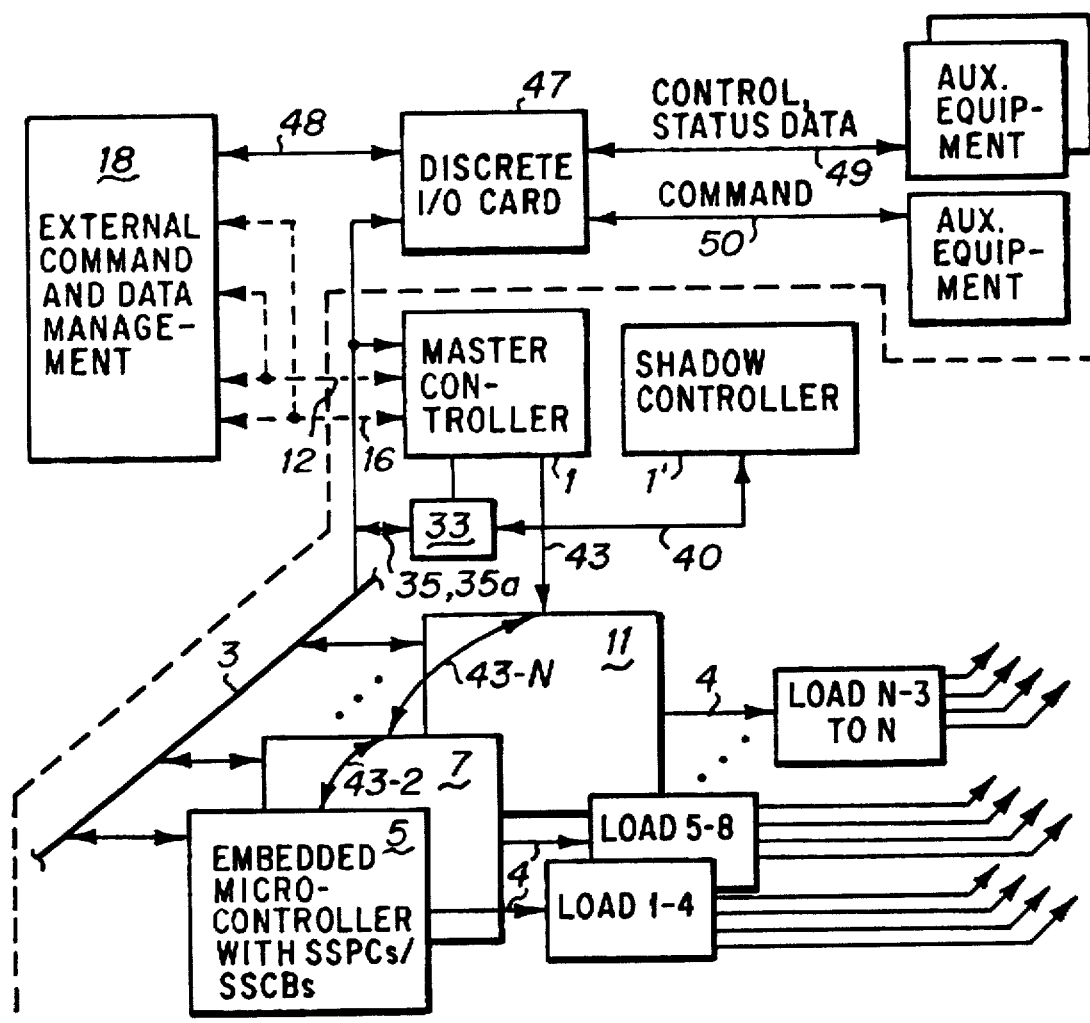
Fig_3

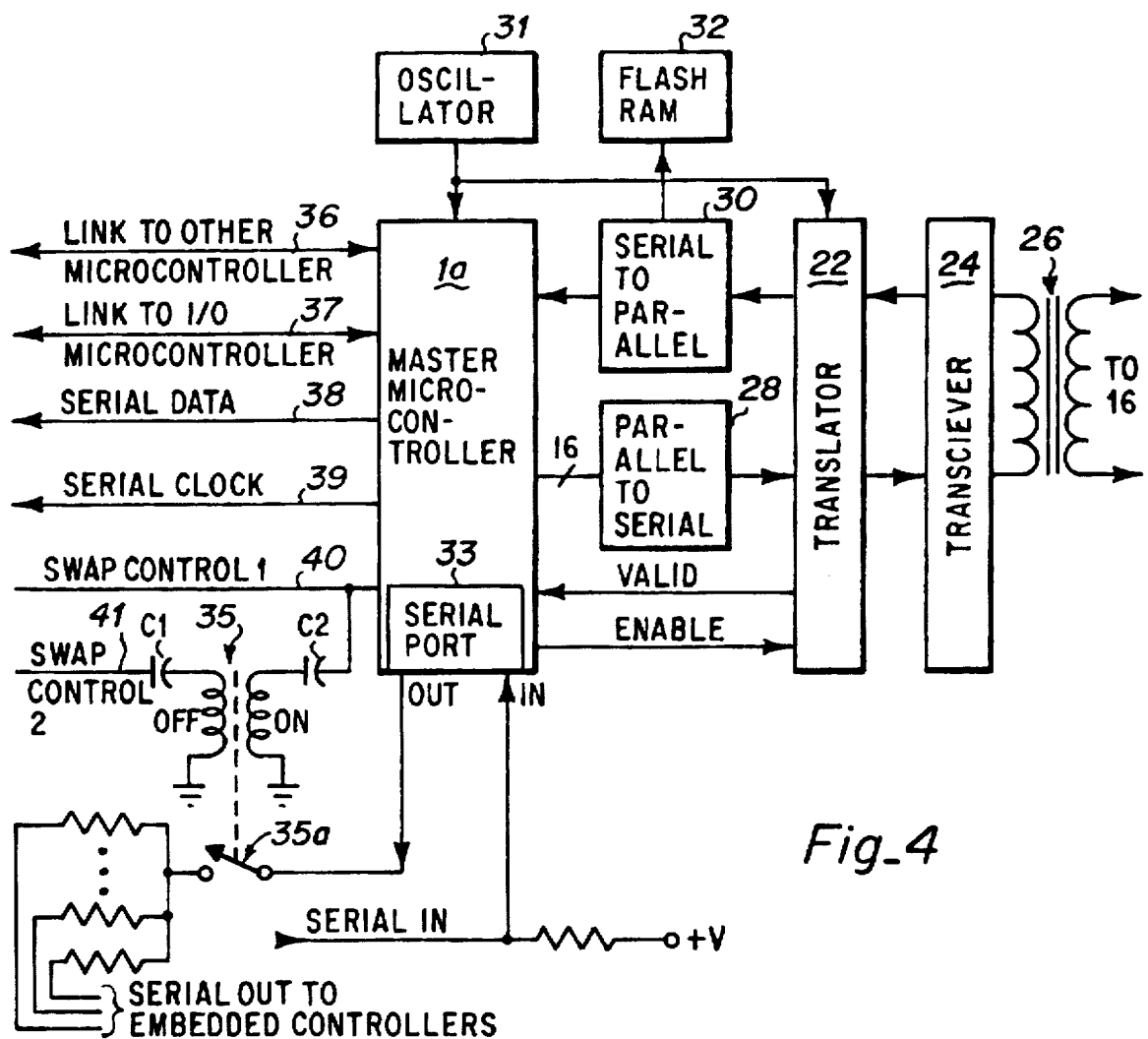
Fig_4

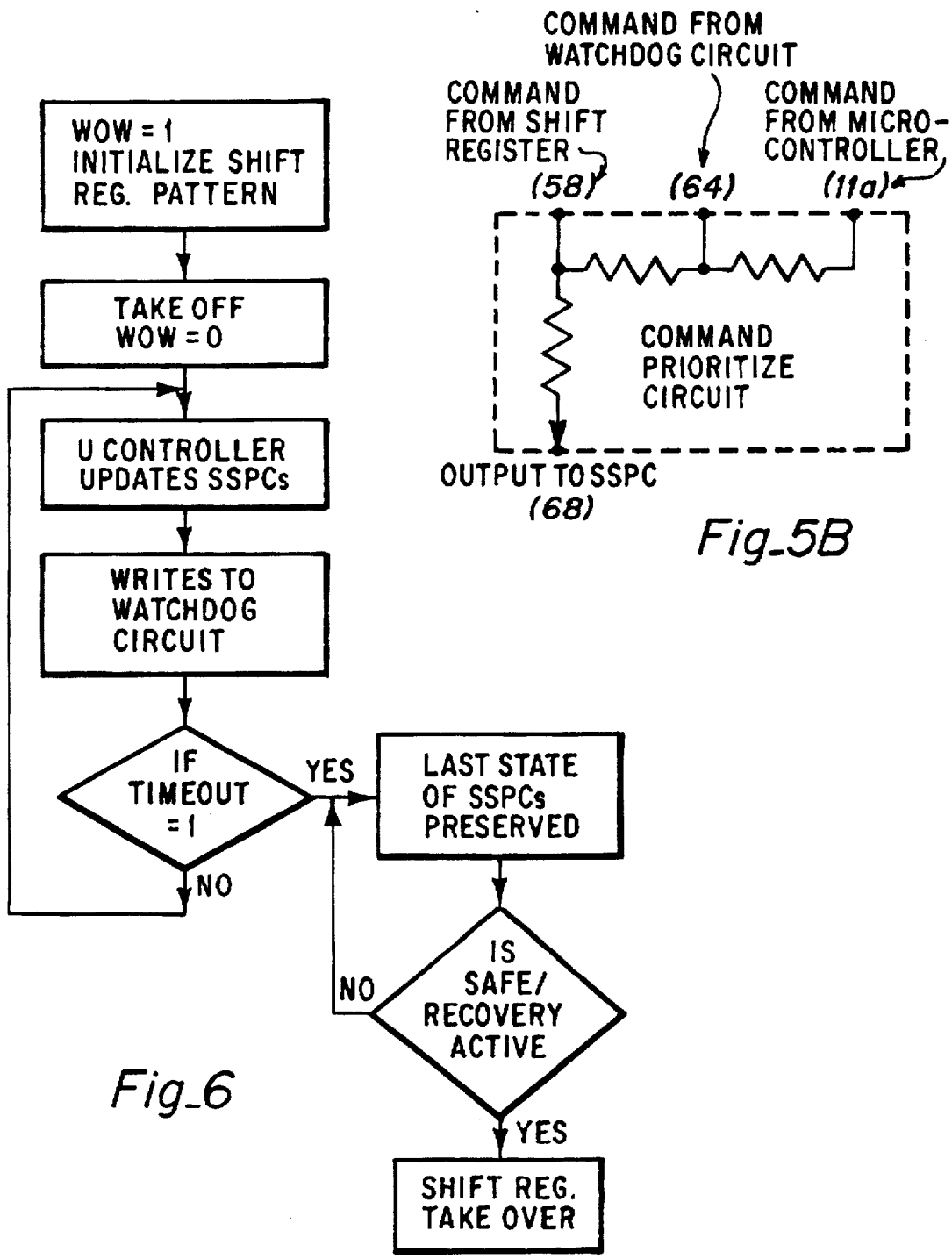

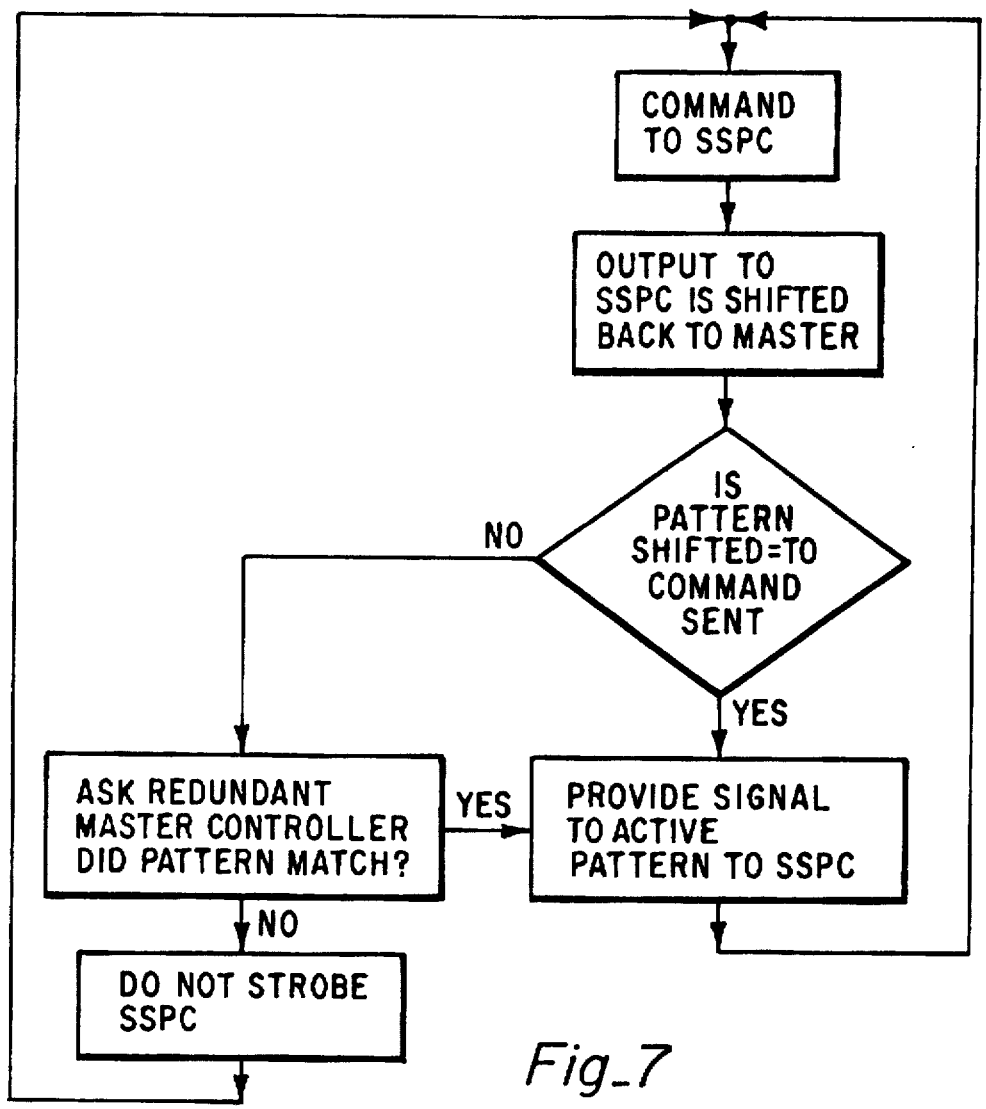
Fig_7

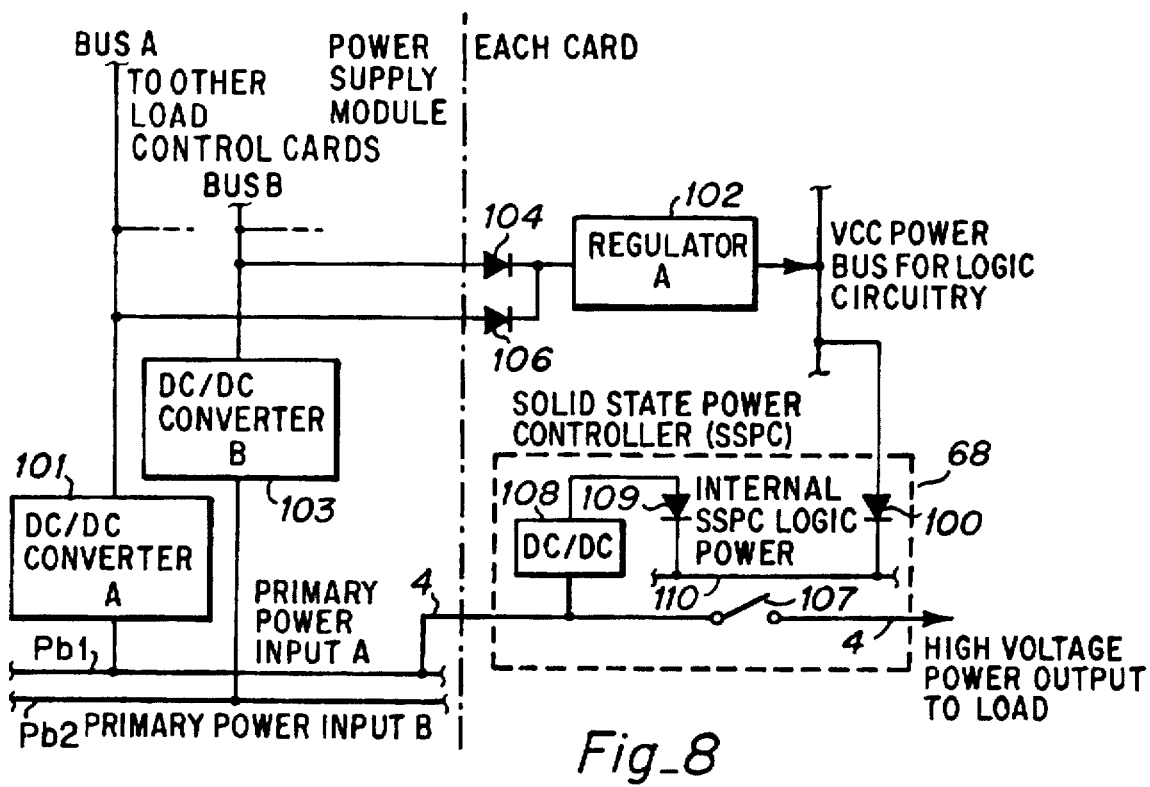
Fig_8
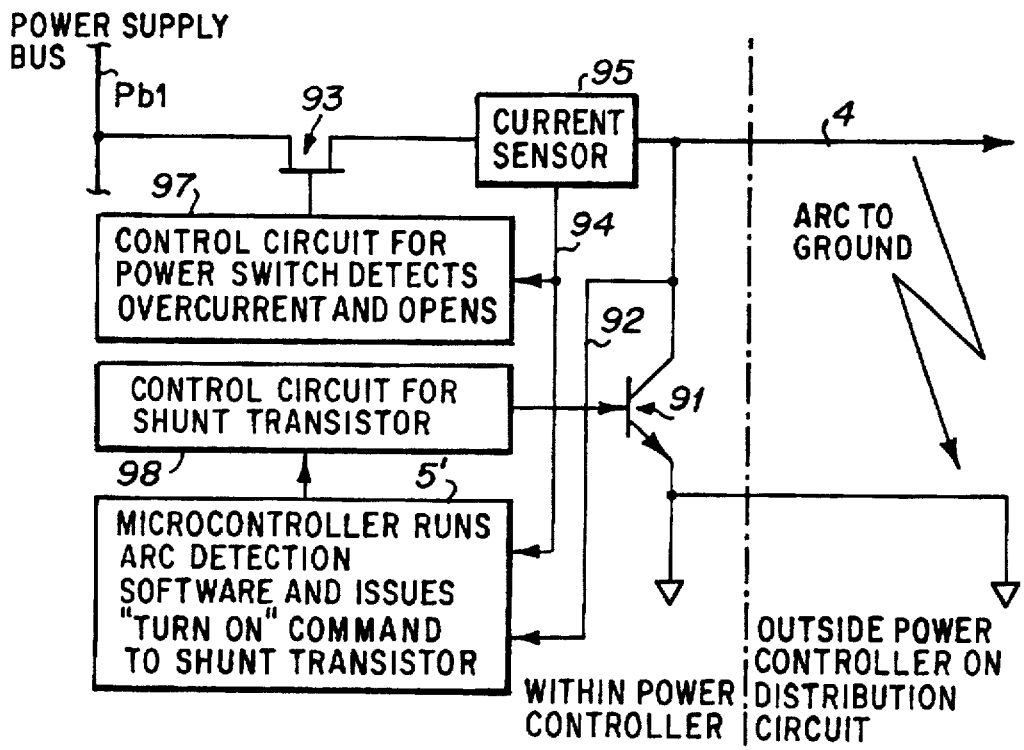
Fig_9

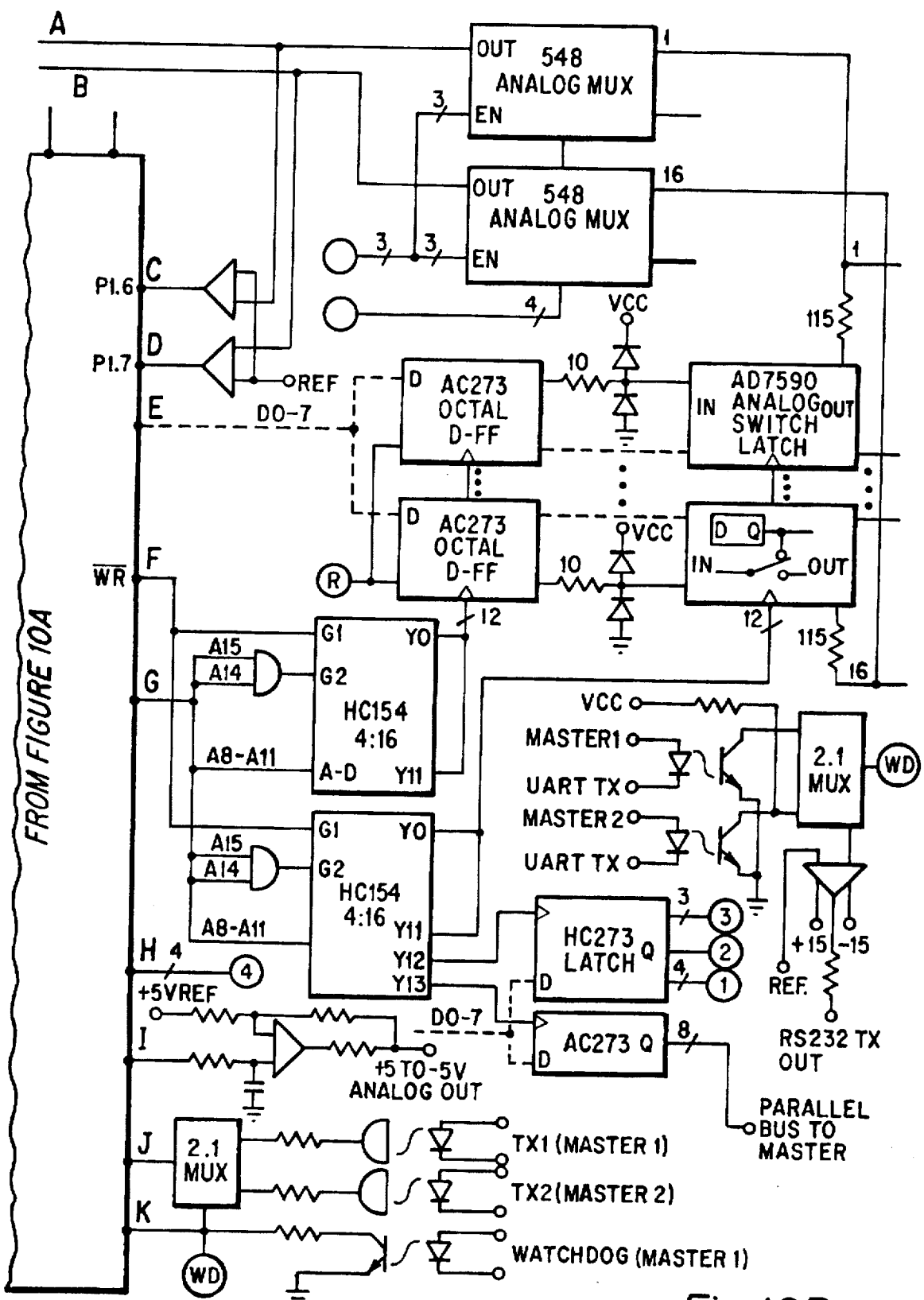
Fig_10B

MODULAR SOLID STATE POWER CONTROLLER WITH MICROCONTROLLER

This application is a continuation of application Ser. No. 08/513,714, filed Aug. 11, 1995 now abandoned.

FIELD OF THE INVENTION

This invention relates to modular solid state computer controlled power controllers and, more particularly, to fault tolerant power controllers for electrical power systems management systems for vehicles, such as air craft, space craft, and marine electrical systems, having multiple separately controlled electrical loads.

BACKGROUND

Electrical power load management provides automation for control of electrical switches, energizes and de-energizes individual electrical loads, and provides fault isolation and wire protection in various kinds of vehicles, such as automobiles, aircraft, space craft and ships, by means of electrical load control units referred to herein as Electric Load Management Centers, "ELMC". Various numbers and sizes of ELMCs are placed at various locations around the vehicle, typically, to optimize overall vehicle packaging and minimize power distribution quality problems, such as electromagnetic interference, "EMI", and minimize the voltage drops that inherently occur along transmission lines and increase with the transmission line's length. Apart from the physical housing for the unit, present ELMC's contain three basic electrical characteristics; individual power control devices such as electromechanical relays, fuses and circuit breakers, the necessary command and data management to support such power control devices, and an interconnection system, such as a wiring harness or printed circuit board.

The ELMC's power control devices require ELMC electrical interfaces for command and control signals, data acquisition for "health" monitoring of the equipment's operation and the power signals which are interconnecting the electrical supply with the electrical load. When many such power control devices are located in one ELMC, a problem arises in handling the number of electrical interfaces to the power control devices. The command and data management system within the ELMC typically contains a microprocessor, microcontroller, digital state machine or analog controller, as variously termed and which is referred to herein as a "microcomputer", to provide the ability to manage the many control and data signals passing between other vehicle systems and the individual power control devices.

Such management system, in addition, typically contains data multiplexing circuits between the microcomputer and the many power control devices. Such data multiplexing circuits are used to interface the parallel digital bus, originating from the microcomputer, with the many discrete electrical signals associated with the power control devices. The electrical interconnection, such as a wiring harness or printed circuit card, carries all the electrical signals, including power, control and data, that are routed between the ELMC's input and output electrical connectors and the many internal ELMC components.

The microcomputer serves as the ELMC's primary interface with the vehicle management system and communications with that system and is connected to the system via an appropriate data bus. To the present, the architecture of such ELMC units employ a microcomputer and one or more data multiplexing printed circuit cards, herein referred to simply as "cards", whereby discrete commands to the individual power control devices are interfaced to the microcomputer's parallel digital bus port. This interfacing allows computer software, the program associated with the microcomputer, to manage discrete command signals and data interfacing with the many power control devices. In using a parallel form of data transmission between the microcomputer and the data multiplexing cards, and then many discrete electrical command and data signals interfacing with the power control devices, presumably the thinking of the designers of that system may have been that the information is thereby propagated more quickly and reliably than a serial bus arrangement and provides a method to interface with the many signals associated with the power control devices.

Further, newer power management systems of the foregoing type propose use of solid state power controllers, herein referred to as "SSPC", as the power control device. SSPCs are typically a collection of power electronics and associated analog control electronics placed into a single electrical component package. One typical SSPC function is that of overcurrent protection for the electrical load. The SSPC therefore provides a solid state electronic alternative to the fuse, relay and circuit breaker used in the earlier prior art.

To carry out its function therein, each SSPC switch requires a number of discrete I/O signals, that is, command signals, which are low power TTL level interconnects between high impedance sources and sinks. These low power command signals are of necessity placed in close proximity to the high current power supply conductors and load conductors on the interconnecting backplane card, which interconnects the same SSPC switches to the microcomputer. Without taking extraordinary protection, the low level discrete signal lines in the backplane can be perturbed by the electromagnetic radiation interference, EMI, radiated from the high current source and the load conductors that share the space on the backplane. With ELMC's containing ever more greater number of SSPC cards, that EMI problem is exacerbated.

Prior design practice was to decode the system data bus command on the microcomputer card, and then issue discrete commands, typically TTL level signals, via the backplane and the data multiplexing card (I/O) to the individual SSPC. Likewise, data from the SSPC was transmitted back to the microcomputer card, via the backplane and the I/O card for action by the microcomputer or for presentation to the system data bus. The latter data was also typically TTL level signals and low level analog signals, typically in the range of 0 to 5.0 volts. In total, the command and data interface signals required between eight and ten backplane conductors, "traces", each for each power control switch. For an average SSPC population of 100 switches, as example, the backplane is required to support up to 1,000 low level signals, requiring that many trace lines and plated vias.

Those 1,000 lines extend lengthwise down the backplane and were oriented for most of that length in parallel to the high power source and load conductors. Unfortunately that parallel orientation is precisely optimal for electromagnetic coupling of energy from the power conductors to the low level signal conductors. To prevent corruption of the low level signal, thus, special precautions must be taken, which undesirably adds to the parts count, power consumption, weight and size of the ELMC. Even having taken such precautions, signal corruption may still occur, leading to system malfunctions and the return of questionable data to the vehicle management system.

Further, as greater number of processing functions are demanded of the microprocessor in such systems for completion within a prescribed short time interval, faster microprocessors must be substituted. It is estimated that the microprocessor in present ELMC systems must minimally accomplish a through-put of one mip. Moreover, if special data processing is required, such as the processing required for arc detection and fault diagnostics, a minimum through-put of fifteen mips is required. With faster microprocessors there is greater heat production, an undesirable side effect in most vehicle systems; and those faster microprocessors are much more expensive, which is also generally undesirable.

One might look to a solution to the computer speed barrier reached in connection with mainframe computers that, at first glance, might superficially appear to offer solution to the processor speed limit here. A theory of distributed processing allowed division of calculations amongst a multiplicity of slower computers and the results of the separate computations are combined into one, thereby achieving the result in the same time as the faster computer, but with slower speed lower cost processors than a more expensive mainframe. The apparent programming complexities in such an alternative appear as an obstacle to implementation. Even so, such theory does not offer any cure to the EMI problem endemic in the present power controller design.

Accordingly an object of the present invention is to reduce electromagnetic interference within a ELMC.

Another object of the present invention is to minimize the number of parallel electrical leads required on the interconnecting backplane member of a modular power controller system.

A further object of the invention is to eliminate the necessity for a data multiplexing card in an ELMC.

A still additional object of the invention is to provide an all solid state ELMC.

The accomplishment of the foregoing objects provides a novel ELMC that is of lower cost, smaller size, and lesser weight and greater reliability than prior ELMC's, which, accordingly, is an ancillary object of the invention.

SUMMARY OF THE INVENTION

The novel system architecture identified with the present invention is that of a serial digital bus directly interconnecting the microcomputer on the controller card with a distributed microprocessor on each of the individual satellite cards containing the power control devices. The novel architecture allows the elimination of data multiplexing cards and minimizing the presence of signals on the electrical interconnection backplane card.

In accordance with the foregoing objects, the improved power controller includes lower cost low speed satellite or slave microcomputers embedded within the satellite load cards to control a number of semiconductor power switches that are associated with corresponding individual electrical loads. The principal or master controller microcomputer on the controller card communicates bilaterally with each of such slave microcomputers via a serial data path that extends along the backplane card and interconnects the former computer with each of the satellite load cards, issuing commands in digital serial form. Those commands are received by the addressed slave microprocessor, and is interpreted and acted upon by controlling the semiconductor power switches associated with the respective slave card.

In accordance with the foregoing objects, the improved ELMC includes low cost, lower speed microcontrollers used in a distributed command and control architecture that works in concert with the primary microcomputer, earlier described. For purposes of description, such distributed microcontrollers are sometimes herein referred to as "satellite or slave" microcontrollers.

The slave microcontrollers are typically single chip microprocessors with integrated analog and digital interfaces. In one practical embodiment, as example, such slave microcontroller comprises a 16 bit, 12 Mhz, computer with Random Access Memory (RAM), Read Only Memory (ROM), analog to digital converter (A/D), eight channels of analog multiplexing and multiple digital discrete inputs and outputs all located upon a single chip, which is in contrast with a typical microprocessor, which only contains the computer, memory and parallel digital bus interface located on a single chip. Each such slave microcontroller is placed on a respective card, referred to as a load control card, together with several power control devices or SSPCs.

Each such slave microcontroller and its associated interface circuitry is responsible for closed loop data acquisition, data processing, and control functions associated with the few power control devices located on the same load control card. The distributed slave microcontrollers are in periodic communication with the higher level microcomputer within the ELMC. The foregoing contrasts with the prior ELMC's, wherein all of the power control devices were ultimately directly controlled by a single microprocessor in a centralized architecture.

The ELMC's principal or master microcomputer is mounted on a card, referred to as the "controller card", together with the internal and external communications hardware. The master microcomputer communicates bilaterally with each of the slave microcontrollers via a serial digital data path that extends along the interconnection card, referred to as the "backplane", that interconnects the principal microcomputer with the slave or satellite microcontrollers distributed amongst the load control cards, issuing commands and data in serial digital form. That information is received by the addressed slave microcontroller, is interpreted and acted upon thereby to control the SSPCs on the respective load control cards. The slave microcontrollers acquires and provides status and diagnostic information in serial form to the master controller along the same serial bus.

It is appreciated that the invention utilizes an all solid state architecture. However, when replacing magnetic, latching electromechanical relays with solid state counterparts, SSPCs, one must anticipate and compensate for the potential failure mode of all SSPCs. As those skilled in the art appreciate, when electronic control circuit bias power is lost, the solid state power electronics that is conducting current to the load at that time, loses supply voltage and inadvertently shutdowns, interrupting load current. Such a scenario is recognized as dangerous in many vehicle implementations. Further, modern SSPC devices include the ability to change or program the operational characteristics, such as overcurrent trip characteristics. The operational performance configuration data that is programmed into the SSPC device is also susceptible in many cases to loss of supply voltage.

In accordance with an additional aspect to the invention, novel circuit means are included to ensure that the semiconductor power switches hold their last set state in the event of a primary system power supply failure, whereby those semiconductor switches emulate the familiar electromechanical mag-latch switch.

In the preferred form, the invention includes a default command channel via a hard-wired data path that is daisy chained between the master controller and each of the satellite load cards, ensuring operator availability of a fixed default command for the separate load cards that overrides any configuration commands from the slave microcontroller. In this an initial default operating configuration for the load power switches, maintained in the master controller, is sent via another serial data bus, separate from the serial data bus, to each of the satellite cards, where that default configuration information is maintained available. In a practical embodiment the foregoing is accomplished by digital feed-in, feed-out devices, such as a serial to parallel shift register on each satellite card, with the shift registers formed in a daisy chain arrangement. By supplying a hard-wired override signal, the load power switches are configured to such stored default configuration.

For additional reliability a shadow master controller is included. The principal microcomputer will be redundant to provide a fail safe capability. That is, a spare or back up microcomputer is included on the controller card that may be switched into the circuit to substitute for the primary microcomputer in the event the latter fails.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustrations thereof presented in the accompanying drawings.

BRIEF DESCRIPTION OF THE DRAWINGS

In the Drawings:

FIG. 1 is a functional block diagram of the improved modular solid state power controller;

FIG. 2 is a partial pictorial view of the physical arrangement of circuit boards within an improved modular solid state power controller, illustrating the orientation of the cards, including the backplane;

FIG. 3 is a block diagram of another embodiment of the invention that shows in greater detail the relationship of the invention to external apparatus and reliability enhancing features;

FIG. 4 is a schematic block diagram of an embodiment of the master controller or microcomputer card used in the embodiment of FIGS. 1 and 3;

FIG. 5b illustrates a command prioritize circuit used in FIG. 5;

FIG. 6 is a flow chart that aids in the description operation of the "watchdog" protective circuit included within FIG. 5;

FIG. 7 is a flow chart that aids in the description of operation of the default command circuit included within FIG. 5;

FIG. 8 is a block diagram of a power failsafe protection circuit incorporated within the power controller of the invention;

FIG. 9 is a partial schematic and block diagram illustrating a novel arc detection and "snuffing" circuit, incorporated within the power controller.

DETAILED DESCRIPTION OF THE PREFERRED EMBODIMENTS

Figure 5:
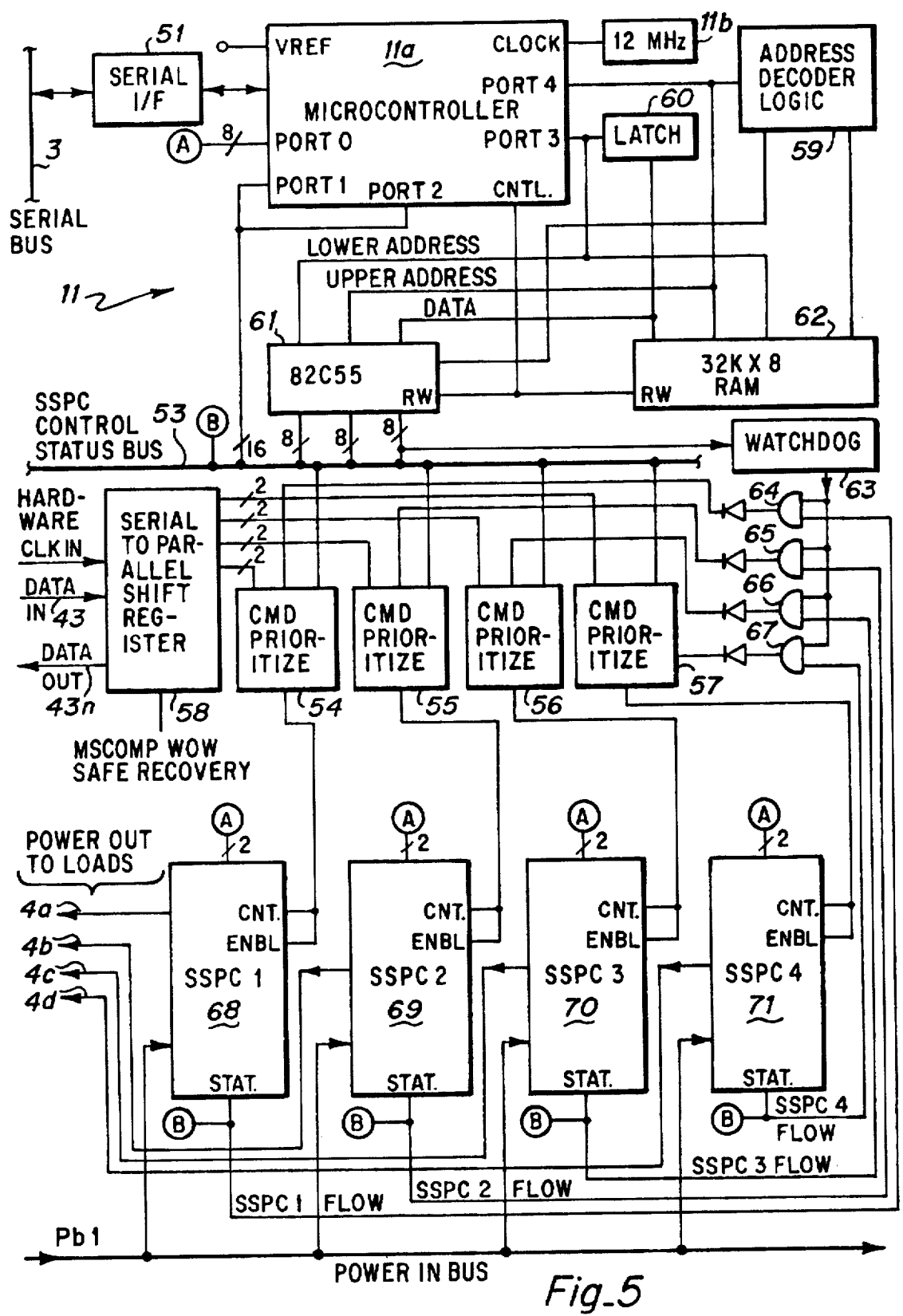
FIG. 5 is a schematic block diagram of one of the SSPC load cards used in the embodiment of FIGS. 1 and 3.

FIG. 1, to which reference is made, presents a functional block diagram of the invention. A master microcomputer or microcontroller 1, illustrated as the processor card, is interconnected via serial data path bus 3 to each of the solid state power controller ("SSPC") cards, containing the satellite microcomputers, used in the system, four, as example, 5, 7, 9, and 11; it being understood that fewer or greater numbers of such SSPC cards may be substituted depending upon the requirements of any specific design. Each of the SSPC cards includes, among other circuits, an embedded microcomputer chip, suitably a low cost chip, and an electronic power switching device that opens or closes the a power circuit to an external electric load under control of that embedded microcomputer chip. Microcontroller 1 and the microcomputer chip are familiar digital computers on a chip, containing memory, a processor, and performing functions in accordance with a computer program that is installed in the memory. These elements are not illustrated in detail in this figure, but are illustrated in the subsequent figures and are described later herein at greater length.

Serial bus 3 is bi-lateral. That is, the bus is used by master controller 1 to send digital information in serial form to selected slave cards, wherein the microprocessor associated with the addressed card, receives and acts upon the information. Conversely, the bus is also used by the slave microprocessor to send digital information in serial form to master computer 1, such as information on the status of the associated power switch or switches, the detection of an electrical arc and/or any other diagnostic information the slave computer is designed to supply.

A power circuit transmission bus 4 is connected to each of the SSPC slave cards. That power bus extends to the load coupling connector 6 located in front panel 8, through which the power leads are coupled to the respective external electrical load circuits controlled thereby. The power transmission bus includes a plurality of leads, one for each of the individual electrical loads that the power controller is intended to control, by connecting power through to the load or, alternatively, interrupting the power circuit. The bus also includes the input electrical power from the external source that serves as the electrical power to be distributed by the power controller.

Master microcontroller 1 on the controller (processor) card receives sensor data via the management bus 10, which is connected thereto through coupling 12 at the panel, and receives and sends information to the external management system via data bus 14 and coupling 16, the latter typically being a 1553 type coupling. A portion of serial bus 3 and power bus 4 are physically located on the backplane circuit board, which is better illustrated, in FIG. 2, to which reference is made.

The partially exploded not-to-scale pictorial perspective view of FIG. 2 shows the general mechanical configuration of the components found in FIG. 1. Processor card 1, and SSPC cards 5, 7, 9 and 11 are inserted into the respective circuit board connectors 17, 19, 21, 23 and 25, where they are held in a parallel position. The circuit board connectors are affixed electrically and mechanically to an underlying circuit board 27 that extends orthogonal to the inserted cards, which is customarily referred to as the "backplane". Backplane 27 contains the printed circuit wiring that defines the communication and power bus which extend in parallel along the length of the backplane. The backplane in turn is mounted within a metal enclosure, represented in dash lines, preferably one in which the rear end and sides are formed from a single piece of metal, such as aluminum, for best heat transfer characteristics and maximal cooling.

Suitable coupling cables and connectors complete the electrical circuits from the backplane to the panel connectors and the panel is mounted to the front of the enclosure to allow easy access by the operator. Here the backplane also contains the printed electric circuitry for connecting the leads from the cables to the master controller card 1. Where desired, however, connectors may be attached directly to card 1 instead, thereby reducing the printed circuitry somewhat on the backplane, in which case the cables will run directly to the front panel. Those skilled in the art appreciate that FIG. 2 omits illustration of the plated electrical leads found on the backplane and other printed circuit cards and the details of conventional mounting hardware, which are not necessary to an understanding of the invention, and recognize that the mechanical packaging arrangement used for the improved power control module is entirely conventional in structure and is the same found in the prior power control modules.

It is appreciated that the present power controller of FIGS. 1 and 2 is a sub-system, in which some of the commands that the power controller follows is provided by an external operator or automatic system, referred to as a management system, which provides those commands in proper signal form via the communications input 16. Likewise the present power controller provides information to that external system, including prescribed warning signals and the like. The external system is of any preexisting design, such as is used with the prior power controller designs which the present invention improves upon. Inasmuch as the detailed design of such management systems are not necessary to an understanding of the present invention they need not be further described, except in general terms as outlined in the block diagram of FIG. 3, next considered.

For convenience elements identified by number in the preceding figures where they appear in FIG. 3 are identified by the same number. Thus there is shown the microcontroller card 1, serial bus 3, satellite SSPC cards 5, 7, and 11, power bus 4, which underlies the dash line in the figure. Signal and control communication with an external command and data management system, represented as block 18, illustrated to the upper left, is accomplished via couplings 12 and 16 and the associated transmission lines represented in dash lines.

Each embedded microprocessor on the SSPC card controls a plurality of individual electrical load circuits, four in the example given. Thus each satellite card contains four power semiconductor switching devices, suitably MOSFET power transistors, not illustrated in the figure, and the microcontroller has sufficient outputs to individually control at least that number. For power on for a particular load, the microcontroller supplies a bias to the associated semiconductor switching device and that device is placed in its high conductivity state, conducting electrical current through the power bus 4. It is seen that the power bus comprises thus a large number of individual leads plated on the backplane circuit board that run in parallel along the backplane in FIG. 2.

FIG. 3 also illustrates additional features incorporated within the preferred embodiment of the invention. A default command circuit is provided that provides a default command to the satellite load control unit. This is a hard wired circuit. As later herein discussed, the default command, though present at each of the SSPC load control cards, is activated only at the command of the operator, who operates an activation switch, and thereby overrides any commands issued to the SSPC card via serial bus 3. A second serial output from master controller card 1 is wired, via the backplane, to an input of a first slave card in the series, here card 11. In turn the satellite card contains an output that is hard wired, also via the backplane, to an input on the next succeeding satellite card in the series. In turn the next card contains an output, hard wired to an input on the next card. Such wiring is accomplished for each of the satellite SSPC cards 5, 7, 9 and 11, or in more general terms, where the number of cards is N, for N−1 cards. This wiring of the satellite card is referred to as a "cascade" or "daisy chain" wiring.

In operation master controller 1 issues the address and command via the serial data bus 3. The master controller also clocks out a set of default commands via output 43 as a serial bit stream, containing default commands for each of the load SSPC load control units in the system. That bit stream is clocked into the first SSPC card in the daisy chain. With additional clock pulses, that data is clocked out of the first SSPC card in the series to the next, and so on to the next SSPC card in the series. Suitably that form of serial input and output is accomplished in the SSPC cards with a conventional serial to parallel shift register, as discussed in greater detail in connection with FIG. 5, that receives information in serial form and as the capacity of the register is exceeded outputs those same data bits on a first-in, first-out basis, while also providing a parallel output equal to the number of bits in the shift register between successive clock pulses. The master microcontroller assembles the default command for each SSPC card in the chain in reverse order into the serial bit stream. When clocking is completed, the default command intended for the Nth SSPC card, which is clocked out first in the bit stream, is resident in the Nth SSPC card's shift register.

The foregoing places the default command data at the respective remote SSPC card, awaiting possible use. Should the vehicle operator find need for any reason to override the commands issued by microcontroller 1 via the serial bus, the operator activates a switch, the panic button so to speak, which allows the known default commands to take priority. A conventional prioritizing logic circuit resident in each card insures that commands otherwise received at the SSPC unit is overridden.

Other checks may also be included in the system, such as a "watchdog" circuit, that may additionally included as a second priority to the default in the case the slave microcomputer fails. The latter is incorporated in a preferred embodiment of the invention later described in this specification.

For additional reliability another controller is provided to shadow the principal master controller as indicated at 1' in FIG. 3, wired onto the same circuit board, referred to as the shadow microcontroller, and a back up power source, not illustrated, is also preferably included. Should one of the principal units fail, the shadow or back up unit is switched into place to perform the functions of the failed principal component.

The power supply controller is also easily reconfigured to allow the controller to interface with additional external equipment requiring discrete command and data signals, such as those designated AUX EQUIPMENT in FIG. 3. The former provide signals in analog form and those signals need be "conditioned" and transformed to digital form. This is accomplished by including an appropriate Input Output card 45 within the ELMC. That reconfiguration is easily accomplished by adding a suitable electrical connector to the backplane, in FIG. 2 allowing the I/O card to be contained within the package and communicate with the serial bus 3. An example of the circuit of a suitable I/O card is illustrated schematically in FIG. 10, described later herein. Electrical connections 48, 49 and 50 are accomplished by additional cabling.

Reference is made to the schematic block diagram of FIG. 4, illustrating the master microcontroller card 1. Microcontroller 1a is the principal component of microcontroller card 1. It receives the input information, processes that information, issues commands to the slave microcomputers in the satellite cards in serial form, receives digital information from those satellite computers, and receives and sends digital information to the external management system. To the right of controller 1a are shown the components for communicating with the external management system, including translation semiconductor chip 22, transceiver 24, isolation transformer 26, parallel to serial converter circuit 28, serial to parallel converter circuit 30 and flash ram 32.

Thus data transmitted from the external management circuitry to this power converter is, in this example, transmitted in serial form, arrives via coupler 16, is coupled through isolation transformer 26 and input to translator chip circuitry 22, where it is decoded/encoded and input to circuitry 30 where the command is converted from serial form to parallel form, the form required by the particular microcontroller, and is applied to an input to the controller. In the event the rate of received data is too great for microcontroller 1a to handle, the data is entered into temporary storage in a flash ram chip 30, which thereby serves as a buffer, and is read out from the flash card under control of the microcontroller.

When controller 1a sends data to the external management system, the information is output in parallel form to converter 28, which outputs serial form information that is applied to translator 22, which encodes a serial digital format and to transceiver 24 wherein it is converted to the specified electrical characteristics for serial transmission and from which it is output through transformer 26.

A signal indication that an incoming word has been received is provided on the lead labeled VALID WORD. A signal indication on the lead labeled ENCODE ENABLE initiates transmission of a word. Oscillator 31 is the system clock which provides periodic clocking signals to the controller 1a and translator 22.

Controller 1a contains an asynchronous serial port (UART) 33 for communications to the serial bus 3, earlier described. In normal operation switch contact 35a is normally closed to complete the electrical circuit from port 33 to the serial bus, allowing the microcontroller to send commands along the data bus.

Leads 36, 40 and 41 to the microcontroller and mag-latch switch 35 and associated capacitors C1 and C2 are provided for control of the shadow controller, the redundant controller provided as a backup earlier briefly discussed. The shadow microcontroller, not illustrated in FIG. 4, and microcontroller 1a periodically send one another check bits. A received check bit is interpreted by the receiving controller as meaning the sending controller is operating satisfactorily. Assume for example, that microcontroller 1a becomes disabled and is no longer able to send check bits. The shadow controller interprets the absence of such check bits as microcontroller 1a has failed and that the shadow controller must perform the functions instead. In accordance with its program the shadow controller sends a pulse of current over lead 41, which is capacitively coupled through capacitance C1 and energizes the OFF coil of mag-latch switch 35. The mag-latch switch is a conventional bi-stable electromechanical switch containing two electromagnet coils. When energized briefly, one coil will latch the switch in one state; when the other coil is so energized subsequently, the switch latches in the other state. Upon receiving the current impulse, the mag-latch switch switches into its other bi-stable state and opens contact 35a, which prevents controller 1a from further outputting commands to the serial bus 3, and the latch switch remains in the off-state.

When the power controller is first turned on and initialized, microcontroller 1a sends an impulse of current through capacitor c2, which energizes the ON coil, ensuring that mag-latch switch 35 is in its on state closing contact 35a. Microcontroller 1a also sends a simultaneous pulse over lead 40 to the corresponding mag-latch in the shadow microcontroller to ensure that such mag-latch switch is in its OFF state with the electrical contact, corresponding to contact 35a in FIG. 3, is open, thereby preventing the shadow controller from issuing commands to serial bus 3.

Leads 38 and 39 are provided for the operation of the hardwired verify circuit, earlier herein discussed in connection with the block diagram of FIG. 3. Lead 37 to the IO card couples "handshake" signals to the I/O card for synchronizing data exchange between the I/O card and the master controller 1a. Lead 38, labeled hardwired serial data is the lead over which the output bit pattern is provided to the verification circuit on the slave load control cards, elsewhere herein described in FIGS. 3 and 5; and lead 39 provides the clock signals for that verification circuit.

Figure 5A:
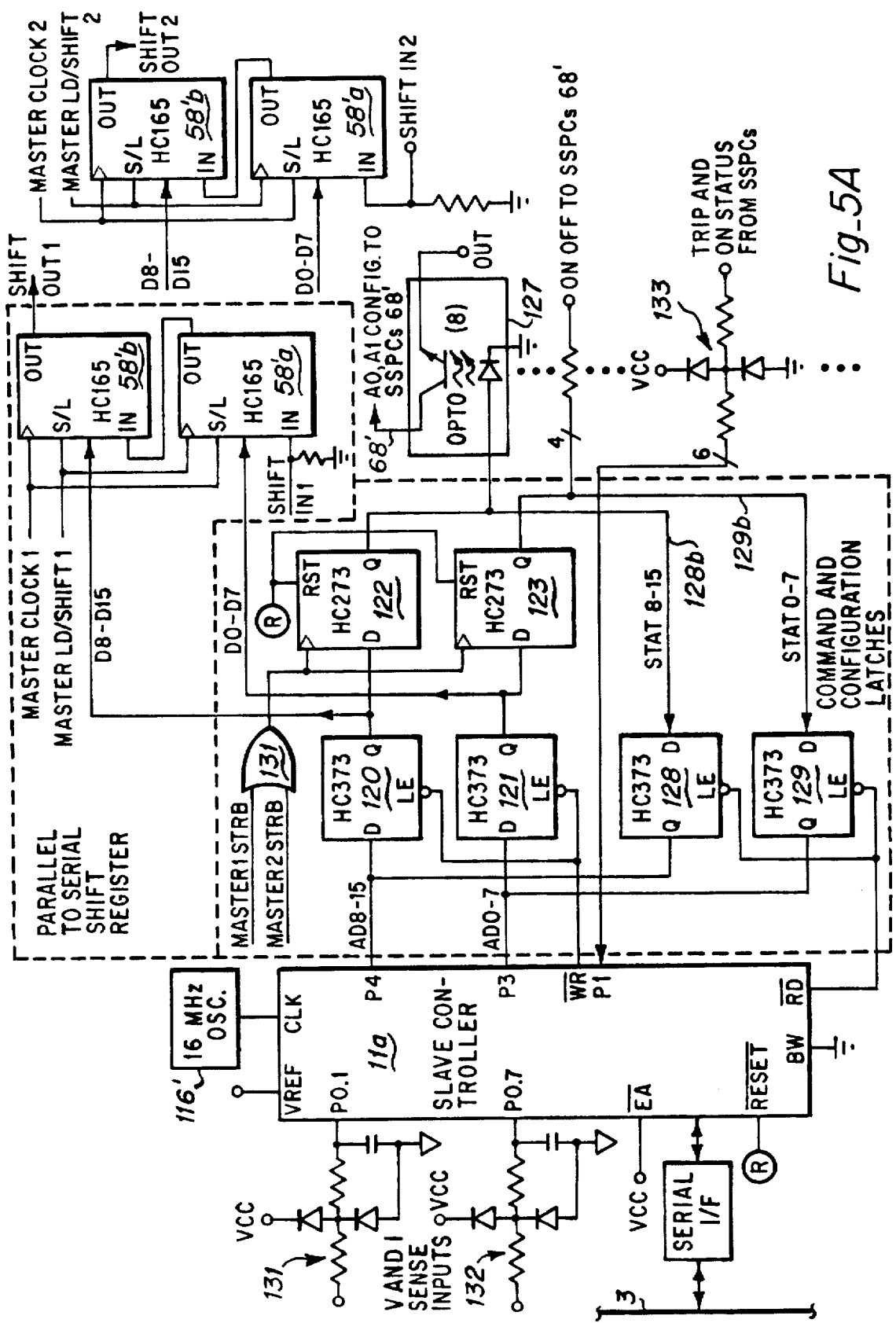
FIG. 5a is a schematic block diagram of an alternative embodiment of one of the SSPC load cards used in the embodiment of FIGS. 1 and 3.

Reference is next made to FIG. 5, which presents a schematic block diagram of a first embodiment of the satellite SSPC cards, used in the embodiment of FIGS. 1 and 3, such as SSPC card 11. It may be noted that an alternative embodiment for a satellite SSPC card is illustrated in FIG. 5a, which is described later herein. The embodiment of FIG. 5, includes microcontroller 11a, a programmed microcomputer containing a program in memory, which in a specific example may comprise the 87C196KC controller chip manufactured by the Intel company of Santa Clara, Calif.; an associated clock oscillator 11b a serial interface circuit 51, control status bus 53 and the four load switching circuits SSPC-1, 68, SSPC-2, 69, SSPC-3, 70, and SSPC-4, 71. The power bus Pb1, coupled to the slave load control card via the backplane, delivers the DC current from the external power supply, which is distributed by the SSPC units to the various electrical loads, through the respective SSPC load outputs, designated as leads 4a, 4b, 4c and 4d, respectively.

For convenience the power supply connections to the various circuit elements, including that applied at Vref of slave microcontroller 11a, not necessary to an understanding of the invention, are not illustrated. However, as discussed later herein in connection with a specific feature illustrated in FIG. 8, two independent regulated DC power supplies are included in the preferred system.

It is noted that some aspects of a practical embodiment of an invention are illustrated in greater detail than may be necessary for an understanding of the invention, such as in connection with the number of digital bits from a port and the like. In accordance with drawing convention, the number of digital bits output in parallel from a port is represented by a number; the number of leads in a line is sometimes represented by a slash across the line and accompanying number.

Slave microcontroller 11a receives and processes the command information addressed to it appearing on serial bus 3, which is supplied in a high level language. The microcontroller translates that command and outputs a lower level code to which the selected one of the SSPC MOSFET power switching devices ultimately responds as later herein described in greater detail, by completing or alternatively interrupting the associated electrical load circuit 4a–4d. Microcontroller 11a outputs a command from ports 1 and 2 along bus 53 as a sixteen bit code.

In this embodiment, the particular microcontroller chip selected for reasons of practicality is limited to thirty two input output ports, while the circuit has forty I/O's. To account for 40 locations thus, the circuit includes address decoder logic 59, latch 60, ram 62 and programmable peripheral interface chip 61. Thus information from ports 3 and 4 of microcontroller chip 11a are multiplexed from chip 61 as a command and status's from the SSPC's. It is appreciated that a suitable microcontroller may be constructed on a custom basis that would be capable of handling the number of addresses required for the practical embodiment. To do so, however, would greatly increase the cost of the chip, which is not desirable.

The hard wired daisy chain default command circuit was earlier described in connection with FIG. 3. The daisy chain circuit for extending the default command data from the master microcontroller and between the satellite SSPC cards enters the circuit at 43 and exits via lead 43. A clock signal that is supplied by master controller 1a in FIG. 4 also extends along the backplane between the master controller and each of the satellite boards which is also shown to the left in the figure as "CLK IN". The clock, data in and data out leads are coupled to the corresponding inputs and outputs of serial to parallel shift register 58.

In operation, assuming the shift register circuit has been initialized, as subsequently described, data bits are serially applied on lead 43 by the principal microcontroller 1a and are clocked into shift register 58. As that operation progresses, when the number of digital bits received exceeds the capacity of the shift register, an overflow condition is reached in which, as is known, the shift register empties the old data on a first in first out basis with each additional clock pulse received. The excess bits are clocked out from this shift register into the next shift register in the next load control card via Data Out lead 43n, while the present shift register receives additional bits; and so on, from that shift register to the next, continuing until microcontroller 1a has sent a sufficient parade of bits to fill all of the shift registers.

The foregoing creates a particular pattern of bits in each of the shift registers, including shift register 58 in this figure, that appear as an eight bit parallel output obtained from the shift register. The satellite's shift registers are daisy chained together and the parade propagates through, bit pattern propagates through from the master to the respective satellites. By design, each "bit pattern" is applicable to only one of the many satellite load cards. As an example in the embodiment illustrated this overall parade of bits required to fill all of the shift registers in a four load card system is thirty two bits in length. However, the parallel output of the shift register is inhibited unless a signal is applied at "MSCOMP WOW safe recovery" and to achieve that signal the operator must turn on an external "DEFAULTS" switch, not illustrated. Effectively, thus the output of the shift register indicates a command to be implemented or a do not care and that command is registered and stored at the load control card awaiting possible implementation.

Returning to FIG. 5, the embodiment includes command prioritize circuits 54, 55, 56, and 57. The highest level priority is at the left input in the figure, the second level priority is the middle input and the third level priority is at the right of the priority circuit block. The prioritize circuits are conventional logic circuits formed of combinations of gate circuits and/or resistor diode combinations, which assign a priority to multiple input signals, permitting only the highest level priority through. The prioritize circuit outputs a two bit digital code to the control and enable inputs of the associated SSPC.

Returning to FIG. 5, two bits of the parallel output from shift register 58 are assigned to a first level priority input of each of the command prioritize circuits 54, 55, 56 and 57. This gives the default command, the highest priority, but only in the event the operator operates the DEFAULTS switch or a comparable hard wired default signal is applied automatically by external equipment.

Microcontroller 11a supplies the discrete load command information decoded from serial bus 3 as a discrete digital signal, the number of bits in the signal, being a design choice for the SSPC design. Assuming that neither the default command or the watchdog circuit 63 provides an output, the command prioritize circuits 54–57 passes the load control command to the input of the respective SSPC power transistor circuits 68, 69, 70 and 71.

Following receipt of first transmitted data, the master microcontroller reinitializes the shift registers. Master microcontroller 1a in FIG. 4 produces additional clock pulses to shift the data out of all of the shift registers. The data is shifted out serially, under control of the clock pulses, through the data output 43n and is input to the data input of the next satellite card and ultimately is sent back to master controller 1a on the controller card. According to its program, the master controller recognizes the returned bit pattern as the same as that sent, and deduces that the shift registers in the daisy chain are cleared for the next operation. This is the same process that is accomplished once the system is first powered up and the system is initialized, including clearing the shift registers in the daisy chain.

To eliminate the possibility of false SSPC configuration programming data or the failure of the slave microcomputer 11a, a unique circuit is preferably included in the power controller, wherein the power controller is said to be fault tolerant. This is called the watchdog circuit.

Returning to FIG. 5, thus, the output from chip 82c55, 61, containing the command from microcontroller 11a, is input a pulse to "watchdog" circuit 63, shown in block form. The watchdog circuit contains a timer that resets with each pulse input. The watchdog circuit recognizes that it is receiving pulses and, therefore, applies a "false" signal output in parallel to the not input of each of the NOT gates 64, 65, 66 and 67. With the gates thus inhibited, the second input does not pass through.

The second input to gate 64 is the output from block 68 "sspc1flow", which represents the existing or current state of the SSPC from the associated power switch circuit SSPC1 as output at "sspc1flow"; the second input to gate 65 is the output from block 69 sspc2flow; and so on with the second input of each gate being connected to the "sspcflow" output of an associated one of the SSPC power switches. As long as microcomputer 11a functions, thus, those sspcflow signals do not pass through to the respective prioritize gates 54 through 57.

If, however, the microcomputer fails to write to the watchdog circuit, the watchdog circuit fails to receive a pulse from the slave microcontroller within a predetermined period of time, the internal timer "times out" and the circuits outputs are switched to TRUE, opening gates 64 through 67. The watchdog circuit then gates the outputs of gates 64 through 67, and the various SSPCFLOW data from the SSPC's 68–71, representing the existing or current state, as variously termed, of the SSPC's, either "on" or "off", is thereby applied to the second level priority of the respective command prioritize gates 54–57.

Assuming the DEFAULTS switch has not been operated to give the default command a higher priority, the outputs of the watchdog circuit override any signals applied to the third level priority inputs by microcontroller 11a and are applied through the respective command priority gates to the control and enable inputs of SSPC 1 through SSPC 4. This action effectively latches those SSPC's into their existing state. No new command information can be entered into the SSPC's. The SSPC's continue the state, whether conductive or non-conductive, in which they were last set.

The steps specified for the watchdog circuit and priority handoff to the next lower priority check, the hard wired shift register command verification circuit, is illustrated by the flow chart of FIG. 6. The microcontroller initializes the shift register pattern. The microcontroller then removes the wow=0 and, in the next step, sends the address and command data to each of the load control cards, such as that illustrated in FIG. 5, via the serial data bus, to the slave microcontroller, such as 11a, which thereby updates the individual SSPC units on each load control card, such as 68, 69, 70 and 71 in FIG. 5, in the manner earlier described and writes the proper code to the watchdog circuit 63. The watchdog circuit contains an internal timer that resets each time a pulse is received from the slave microcontroller. If timeout =1 is negative, a portion of the cycle is repeated causing microcontroller 11a to again update. If that timeout is positive, meaning a failure of the slave microcontroller or its software, then the SSPC units are maintained in the last state. If a safe recovery is later activated, then the shift register verification procedure is allowed to take over and, as the next highest priority, ensure a correct verification.

It is noted that each SSPC 68–70 includes voltage and current sensing outputs, represented at the encircled letter A, a that provides an analog signal of the voltage and current at the load circuit. Those outputs are connected to the input of slave microcontroller 11a, also labeled encircled letter A, and the microcomputer's internal analog to digital converters, not separately illustrated, converts that information to digital form for processing by the microcomputer in accordance with the microcomputer's diagnostic routines.

Reference is now made to the alternate embodiment of FIG. 5a in which corresponding elements to those in FIG. 5 are identified by like numbers. The command prioritize circuit and the watchdog circuit of FIG. 5 is unnecessary and is not present in this embodiment. In this embodiment, software cross checking and verification is accomplished by permitting the master microcontroller to verify that the correct command is about to be sent to the SSPC, while maintaining the command in a buffer of sorts, prior to finally sending the command.

The appropriate DC voltage is applied at Vref and the slave microcontroller has the associated clock oscillator 116'. The voltage sense and current sense monitoring inputs of the microcontroller, which monitor the respective voltage and current of each load circuit associated with an SSPC, such as illustrated at SSPC's 68–71 in FIG. 5, correspond to the encircled A locations in FIG. 5, are shown. Those inputs include suitable input electronic limit and protection circuits, as at 131 and 132 connected to PO.1 and PO.7, the intermediate ones PO.2–PO.6, not being illustrated. The slave also includes a write output at WR and a read output at RD.

The pair of shift registers 58'a and 58'b are placed in series with the serial output of 58'a feeding into the serial input of register 58'b. Those two shift registers are formed into the daisy chain, as in the prior embodiment, with the corresponding pairs of shift registers on the other load control cards. Here the output of the last shift register in the formed daisy chain is returned to the hardware serial data pin 39 in FIG. 4 of the master microcontroller 1, not illustrated. Unlike the prior embodiment of FIG. 5 in which that last serial output of the last shift register in the chain is not utilized. The hardware clock output of the master microcontroller indicated at Master Clk1 in this figure is connected, via the backplane card, to corresponding inputs of both shift registers illustrated and in multiple to the like inputs of all other shift registers having the same function on each of the load control cards.

In this embodiment the master microcontroller 1 (FIG. 4) is programmed to use pin 39 as a serial data input, whereas in the prior embodiment the master controller was programmed to use that pin as a serial data output. As becomes apparent, since a greater quantity of command information is provided in this embodiment because of the current trip adjustment of the SSPC's, the embodiment includes more than twice the number of shift registers as before.

In the embodiment of FIG. 5a, all command and configuration data from the master microcomputer 1 (in FIG. 4) is downloaded as serial digital data to the slave microcontroller 11a via internal serial bus 3. Having received that data, slave microcontroller 11a then issues the corresponding decoded command and configuration information via outputs P3 and P4 to the first stage of latches, 120 and 121, and is written into those latches by issuing a write command at WR. A copy of that latched information is applied to a parallel input of the shift registers 58'a and 58'b, but that data is not inputted until the master microcontroller issues a load strobe pulse at Master LD/Shft1. The master controller next verifies that the proper command data is resident in each of the load control cards.

Assuming all shift registers are initialized, the master controller then supplies a load pulse via Master LD/shft 1 input and the shift registers load the data present at D8–D15 and D0–D7 buses from latches 120 and 121, respectively, in parallel into the respective shift registers. Next the master microcontroller supplies clock pulses via MASTER CLK1 to the shift registers 58'a and 58'b and thereby shifts that data serially along the chain of shift registers in all the other load control cards, returning that data in a serial data stream back to the master controller, via pin 39. This leaves a copy of the configuration command information in the set of latches 120 and 121, which essentially serves as a buffer.

The master controller receives that serial data stream from the shift registers and compares the command data for each load control card with the corresponding data in memory, a basic comparison operation, thereby verifying that the individual on-off and configuration information appearing in that data stream for each SSPC, is correct. That is, the returned information matches the corresponding information that the master controller retained in memory and had earlier sent into the registers.

Once the master microcontroller inspects the returned command data and verifies that the command data is correct, the master microcontroller outputs a digital pulse or strobe MASTER1 STRB, as variously termed, through OR gate 131 to the second stage of latches 122 and 123. In response, the second stage of latches, 122 and 123, outputs the data on the output data bus, which is an eight bit parallel bus as shown, to associated SSPC units 68', 69', 70' and 71', not illustrated in this figure, via respective opto-isolator units, such as 127, and CTL leads, such as 130, illustrated in connection with the first SSPC 68'.

The foregoing steps and the action of microcontroller 1a is illustrated by flow chart of FIGS. 7. As specified by the steps in the flow chart of FIG. 7, the master microcontroller 1a of FIG. 4 issues a command to the SSPC via the serial data bus 3 as earlier described; it then produces the load shift output and clock pulses to the shift registers on the load control cards via a hard wired circuit to shift the parade of bits back to the master controller where the bit pattern is checked to verify that the shift registers contain the proper commands for each of the respective SSPC power switches on the load cards. If the verification is made, the master controller issues the strobe command STRB1 to activate the load commands at the SSPC load control cards, which is accomplished in the manner earlier described. If the master microcontroller cannot determine whether the command was shifted, it requests the back up master microcontroller to check it out. If positive confirmation is made by the back up master microcontroller, the procedure continues to activation as before; if not the procedure grinds to a halt and stops.

The embodiment of FIG. 5a does not require either a watchdog circuit or a command prioritize circuit as did the embodiment of FIG. 5, earlier described, since the command signal to the SSPC is verified to be correct prior to actually outputting the command to the individual SSPC's.

While the daisy chained serial to parallel shift registers in the embodiment of FIG. 5 was used to receive and hold the default configuration command's sent by the master microcontroller for the individual power control cards, in the embodiment of FIG. 5a the reverse is found. That is, the daisy chained shift registers are operated in a parallel to serial mode and are used to return a copy of the command received from the slave microcontroller to the master controller, allowing the master controller to inspect the returned copy and verify the accuracy of the command data retained in the latches on the load control card, prior to implementing the command.

A second copy of the shift registers 58'a and 58'b is provided by serially connected shift registers 58'a' and 58'b', illustrated on the upper right of FIG. 5a. The connections Master Clk2, Master LD/shft2, D8–D15 and D0–D7 and Shift In2, correspond to those earlier described for the principal master microcontroller. Inputs D8–D15 and D0–D7 are connected to the output of latches 120 and 121 by appropriate leads, not illustrated. These redundant latches allow the shadow master controller, earlier described in connection with FIG. 3, to have the same level of verification as the master microcontroller in the event of a failover.

An additional pair of latches 128 and 129 are shown in the bottom middle of FIG. 5a. The inputs of those latches are connected via the respective buses 128b and 129b to the outputs of latches 122 and 123. This places a copy of the load configuration information at the respective latch inputs. The outputs of latches 128 and 129 are connected, respectively to the P4 and P3 locations, earlier referred to as outputs. Locations P3 and P4 are under control of the slave microcomputer and are programmable in accordance with the microcomputers program. Thus those locations may be either used as outputs, as earlier described, and at other occasions during the course of the computer program, those locations may serve as inputs and be read. Should the microcomputer issue a read command at RD during the run of its program, the latches 128 and 129 output the earlier received data at P4 and P3, respectively, the microcomputer reads that information and may thus check the load configuration locally.

In the embodiment of FIG. 5a, each SSPC may be configured to operate in one of two modes, the circuit breaker mode and the power controller mode and, further, in the power controller mode, the SSPC may be further configured to different trip current levels, as example, five amps, ten amps and so on.

When configured in the circuit breaker mode, the SSPC is normally "on" and continuously conducts current, opening only when the current sensed becomes excessive, such as occurs if the electrical load, such as air conditioner develops a short circuit. Since the SSPC is a power transistor, a device that does not normally conduct current unless a bias control voltage is present, when power is first applied to power up the system, if the circuit breaker mode is implemented the load command information provides the bias to set the power transistor to "on".

When configured in the power controller mode, wherein the power is to be intermittently applied, such as turned on every now and then, to temporarily supply power to some equipment, such as a fan or pump, as example, the SSPC is normally "off", that is, is in a electrically non-conducting state. It is turned "on" only when needed by the microcontroller and then only for the period that the microcomputer allows. To switch the SSPC to its "on" state, the microcontroller supplies a signal voltage that biases the switching transistor to its conductive state. That signal is applied to the CNL and ENBL inputs, shown also in FIG. 5, of the SSPC.

Moreover, the SSPC power transistor load control circuits in FIG. 5a, corresponding to 68, 69, 70 and 71 in the prior embodiment of FIG. 5, include a feature that allows the SSPC, when in the power control mode, to have its current trip level set to a selected level, amongst one or more current trip levels. This is accomplished by providing a multi-level output at latch 122. That output is converted by converter 127, shown to the right in the figure. Converter 127 is a conventional opto-electric device containing a light emitting diode and a coupled phototransistor in which the transistor's output is a function of the light produced by the light emitting diode. By conventional detection circuitry in the SSPC, such as 68, the trip current level is determined by the current level produced by the phototransistor in converter 127.

Each SSPC also provides information on its status, such as whether the current level has tripped an interrupt, as example, which information is presented in and outputted as two data bits. One of those outputs is represented at 133. With four such SSPC's on the card a total of eight bits is inputted to the P1 input of slave microcontroller 11a in FIG. 5a. The local power control card thus includes self diagnostic ability and information resources. It may also send that information to the master digital controller.

The circuits of FIG. 5 and 5a, earlier discussed, also includes a novel circuit that allows a MOSFET transistor to emulate the bi-stable performance of the electromagnetic mag-latch switch. The characteristics of that electromechanical switch were earlier described in connection with FIG. 4. The mag-latch switch contains two electromagnetic coils, which are separately energized. The switch latches into the state associated with the last coil to be energized.

Subsequent current fluctuations in that coil cannot change the switch's state.

In contrast power electronic switching devices, such as mosfet transistors, require a bias voltage in order to remain in a current conducting state. Should the bias voltage be withdrawn, such as by a failure in the power supply, however temporary, the power switching device will switch to its non-current conducting state. This is not desirable. As example, should the power controller be employed as part of an aircraft's electrical system, one of the controlled loads may be an electric fuel pump. One obviously would not wish the fuel pump to discontinue on aircraft take off, in the event of a temporary loss of power or malfunction in the power controllers power supply. The fuel pump should remain operative.

The bistable characteristic as allows mag-latch emulation is obtained by a redundant, backup, power supply arrangement. First, there are two isolated bias voltage supplies to all circuitry in the ELMC. Second, these supplies are regulated and diode isolated on each card. Third, a power supply is incorporated into the SSPC electronics to provide bias for maintenance of the last command state, even in the event of the loss of the first two power supplies.

That protection circuit is illustrated in greater detail in FIG. 8 in block diagram form, to which reference is made. As illustrated, this preferred form of the invention includes a second power bus Pb2 extending along the backplane card to the load control card. That second power bus is in addition to the power bus Pb1, earlier described in connection with the prior figures, such as FIG. 5, but which was not earlier illustrated. Power bus PB2 is coupled to a conventional DC to DC converter, 103, which down converts the supply voltage, and the voltage is applied to diode 104, located on the load control card, which allows current to flow in only one direction, preventing back flow. From there, the dc supply current is fed through a conventional regulator 102 to the positive supply input of the SSPC 68. Likewise the other power bus Pb1 is connected through DC to DC converter 101 to protective diode 106 and that diode is also connected to regulator 102, where it propagates to the same positive supply input to the SSPC. From the SSPC positive supply input, the DC current is applied through another protective diode 100, located within the SSPC and from there to the internal power bus 110, which in turn is connected internally to the supply inputs of the semiconductors, not illustrated, within the SSPC.

The two power supply circuits are thereby placed in parallel circuit. Should either one fail, the current will be supplied to the SSPC by the other, while the diode in the other circuit prevents current from flowing from the other power supply to the supply that failed.

The foregoing connection from the output of the DC to DC converters is also made to corresponding pairs of regulator and diode arrangement, also located on the load control card, associated with each of the other SSPC's located on that card, such as SSPC's 69, 70 and 71, illustrated in FIG. 5 and those used in connection with FIG. 5a. Such additional circuits and components, however are not necessary to an understanding of the invention and are therefor not illustrated.

The principal power bus Pb1 is also connected by lead 4 to the load input of the respective SSPC. As earlier described At the output of SSPC 68, power bus Pb1 is connected to the electrical load circuit controlled by the SSPC, when the transistor switch located in the SSPC, here symbolically illustrated by the open switch 107, is placed in its electrically conductive state, effectively closing the switch.

Another DC to DC converter 108 is located within the SSPC. Converter 108 has its input tapped to the incoming power line Pb1 and, like the other converters, down converts the voltage to that suitable for operation of the semiconductors, not illustrated, located within the SSPC. The output of that internal converter 108 is in turn connected through another protective diode 109, which allows only unidirectional current flow, and from there the current is supplied to the internal power bus 110. Effectively thus, this forms a third power supply for internally powering the SSPC's semiconductors. Assuming thus logic the Vcc power bus for the logic circuitry fails, and electrical current is no longer supplied to the positive supply input of SSPC 68 via regulators 102 and/or 104, supply current remains available to the SSPC's internal circuits through converter 108 and diode 109. Thus, assuming the power transistor is in its electrically conducive state, ie. switch 107 is closed, at the time of such Vcc power bus failure, which would normally remove the bias voltages from the power transistor, switching the transistor off, the transistor, nonetheless, remains in that electrically conductive state because the bias voltages to the semiconductors are now supplied through converter 108 and diode 109.

The slave monitors power output voltage and current analog's via an analog port associated with the microcontroller to detect voltage when a SSPC has "tripped". If this occurs, a clamping control signal should be applied. The SSPC clamps for any trip or off command. Arc detection is accomplished by the same circuit.

The preferred form of the invention incorporates a novel arc detection and "snuffing" circuit, advantageously formed in conjunction with the slave microcontroller, illustrated in FIG. 9 in partial schematic and block diagram form. In the load control card, the power line extends from the power bus, Pb, through to the load via lead 4, earlier described. That current path is completed by a solid state MOSFET switch 93, which is gated to the "on" condition by an associated control circuit earlier described, represented in the figure by block 97. That switch forms part of the SSPC power control circuit earlier discussed. A current sensor 95 is included in that load current path. A transistor switch 91 has its output connected between the power lead 4, where the latter lead exits the load control card and extends to the backplane card for distribution to the associated electrical load, and ground, in shunt of the load. Transistor switch 91 is normally off, that is electrically non-conducting. With proper output from control circuit 98 providing an "on" bias to the transistor, the transistor switch switches into the conductive state, providing a low resistance current path to ground, shunting the electric load.

The output of the current sensor 95 is coupled via lead 94 to one of the analog to digital inputs of the slave microcontroller 5' situated on the load control card, whereby the information of current level is available to the slave microcontroller, and to the control circuit 97 for semiconductor switch 93. Another lead 92 connects line 4 to another analog to digital converter in the microcontroller, and makes available to the microcontroller the level of line voltage.

In operation should the current sensor indicate an overcurrent condition or "overload", control circuit 97 supplies the proper bias to switch 93 to off, interrupting current to the load. A simple subroutine in the microcontroller's program causes the microcontroller to check the voltage and current inputs provided at leads 92 and 94, to make the determination of the existence of an arc condition and to initiate the appropriate control outputs.

Returning to FIG. 9, when the microcontroller senses the appropriate level of line voltage and current that is recognized as a signature of an electrical arc condition, the controller 5' also issues a command to control circuit 98. In turn that control circuit supplies an input to the control of transistor 91. The transistor then switches "on" and conducts current between the line 4 and ground potential, effectively extinguishing any electrical arc.

The foregoing overload and arc snuffing circuit is illustrated for one such SSPC circuit. That circuit is reproduced in each of the other SSPC circuits on the load control card; and each such circuit is connected to the single slave microcontroller on the load control card through separate analog to digital converter inputs. Where as here the foregoing checks are made with a single microcontroller, the checks of each SSPC is made in a sequential order during the run of the arc check subroutine to the computer program.

It is known that a particular current and voltage signature characterizes an electrical arcing condition in a power distribution feeder. When one electric wire, maintained at one electrical potential or voltage, is located in close physical proximity to another object at a different electrical potential, such as a electrically grounded structure, separated therefrom by a gap, or when a break occurs in the wire, such as is present in contacts within bulkhead connectors, a difference of electrical potential exists across the gap. When the potential difference across the gap exceeds the insulating voltage breakdown voltage of air or whatever medium is separating the energized wire from the other object, an electric arc may form across or "jump" the gap.

When the arc is first formed, a rise in line current is initially experienced, referred to as an overcurrent condition. In prior MCLE systems, such overcurrent condition typically trips a circuit breaker to interrupt power to the power line, or in the present invention, the solid state power control device opens to disconnect the voltage source from the load.

A problem arises in that the arc condition can be sustained, nonetheless, at least temporarily, even after such disconnection if the arc is "fed" with energy stored in the distribution networks and in the electric loads, such as by the inherent capacitance therein. Although relatively short in duration, such continued arcing can cause serious damage to the power distribution system by degrading wire insulation, creating burnt or broken cabling, or even cause a fire in the surrounding structure. It is important, therefor, to detect a residual, sustained arcing condition and extinguish that residual arc before any such secondary damage occurs. Applicant's recognize that the residual arc in the present system is characterized by low amplitude voltage in the electrical node supporting the arc, and the power control switch, which opened due to the overcurrent condition at the commencement of the arc condition, has near zero current flow. Therefore, when a trip condition on the power control device, zero current flow and a residual arc sustaining voltage occur simultaneously in the present system, the control system detects the residual arc condition and extinguishes that arc.

The residual arc is fully extinguished by shunting the arc sustaining energy to electrical ground, thereby de-energizing the arc and extinguishing the condition. This is accomplished in the invention described herein through the use of a shunt transistor switch connected between the distribution line feeder (arc sustaining node) and the ground node. While the use of a fast transistor switch to extinguish an arc is believed to be known, in the present system the fast acting solid state transistor is used in combination with a data acquisition and control technique using the microcomputer, hereafter described in greater detail, a truly new and unique "fuse" structure is defined.

First, the voltage and current are measured on the output of the respective power distribution feeder. These measurements require accuracy on the order of 10 bit digital accuracy (<0.1% full scale accurate) when converted from analog signals. In addition, the arc must be extinguished within approximately one milli-second. To do so requires a very fast analog to digital converter, fast digital data manipulation and command execution via the solid state shunt switch.

In the present invention, this feat is accomplished by software running on the same single chip slave microcontroller used for real time control of the power switches. The voltage and analog signals are routed through buffering circuits directly to the analog inputs of the microcontroller chip. By using a microcontroller with an on-chip 10 bit accurate analog to digital converter, having a conversion time of approximately 20 microseconds per channel, an efficient software code for the microcontroller, which implements the described algorithm, allows the microcontroller to quickly manipulate the received converted data to detect the arc and then issue a digital command to the power control circuit, instructing the shunt transistor to turn on, thereby shunting the arc energy from the arcing node to ground and, hence, extinguishing the arc.

In the preferred embodiment described herein, all four channels under the control of a single slave microcontroller can be scanned for arc detection within the prescribed 1 millisecond period. In systems requiring more channels to be scanned within the 1 millisecond, a different, faster microprocessor or digital signal processor must obviously be used to increase data handling capability to continue to implement the same detection and correction sequence only faster in time to accommodate the additional channels of power distribution.

The master microcomputer polls the "health" of individual slave units by first sending address information and a command for that address. The slave at that address responds by sending the requested data. Analogs and discretes are sampled. Health is determined continuously in the main loop and decisions are made as to trip conditions, such as arc detection and the like, and commands. The slave microcontroller, as example, sends obtains and sends digital state data on the associated SSPC indicating whether the SSPC is on, conducting current, or off, not conducting current; digital health status information, analog voltage and current data for each SSPC power output channel.

Figure 10A:
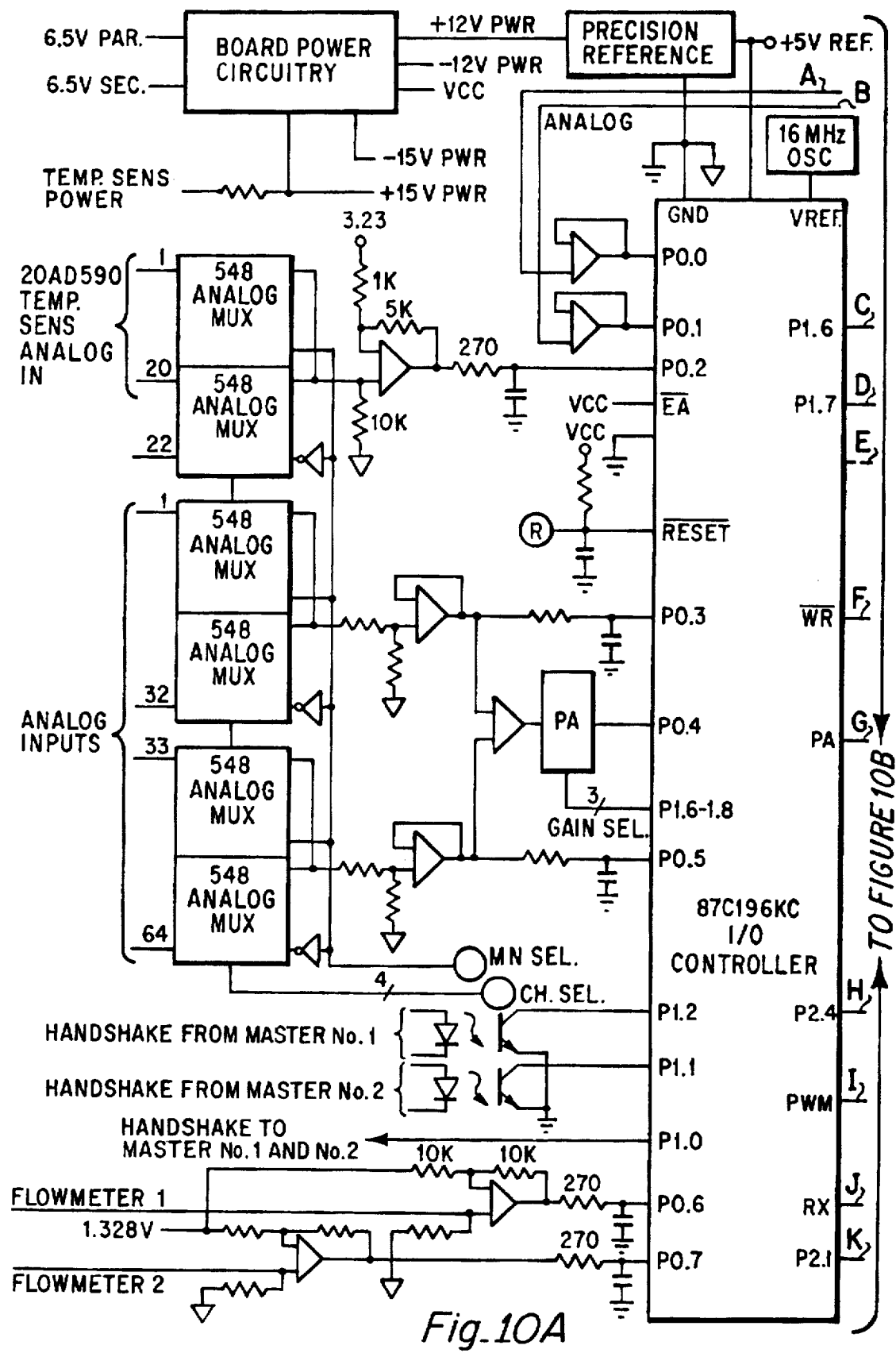
FIG. 10A and B are schematic block diagrams. Input Output card used with the described embodiments.

Reference is next made to FIG. 10 which presents a schematic diagram of the external data input output controller card, earlier generally described in FIG. 3. While not necessary for an understanding of the invention, it is believed that it may be helpful. As earlier described this optional card and microcontroller allows signal conditioning and communication with additional outside sources as may be desired in certain instances. The input output controller card is for analog and discrete data acquisition and the control and issuance of commands to other equipment controlled by discrete electrical signals, such as electromechanical relays. As illustrated the input output controller card contains its I/O controller, Analog Mux's, shown to the left for the analog inputs, power circuitry, appropriate handshake inputs, discrete inputs, analog Mux's, bidirectional discretes, all as labeled and illustrated in the drawings. While the elements and mode of operation of the elements of the input output controller card are evident to those skilled in the art, inasmuch as detailed description of the elements and operation of that input output controller card are not necessary to an understanding of the present invention those details need not be further described.

It is appreciated that the serial bus eliminates the large number of analog and digital signals being transferred by the backplane prevalent in the prior systems. EMI and attendant corruption of data signals is reduced thereby through increased spacing between the serial bus and the high power transmission paths. Through the incorporation of the shadow microcontroller, back up power supply and hardwired override the controller provides both fail-safe and fail-operate modes of operation.

The power controller offers advantage over corresponding power controllers constructed in accordance with the prior parallel bus arrangement. As example the back plane wiring is reduced from 900 traces and 1200 holes to only 150 traces and 200 holes. The local response to sensor data was reduced from a 100 ms latency to a 1 millisecond latency. Twenty four input output chips were required by the prior design; the present requires only one. And the power consumption was reduced from ten watts to only five watts.

The system is easily reconfigured. By including additional connectors on the backplane and room for additional load cards, additional loads may be controlled without EMI interference occurring in the backplane.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, becomes apparent to those skilled in the art upon reading this specification. Thus the invention is to be broadly construed within the full scope of the appended claims.

What is claimed is:

1. A modular power controller for selectively controlling the supply of electrical power to a plurality of separate electrical loads, comprising:
   master digital microcontroller means, including master program means and memory means containing load command information for each of said electrical loads;
   serial data bus means;
   said master digital microcontroller means being located at a first location having a first serial output port connected to said serial data bus for selectively issuing load command information in digital serial form onto said serial data bus for each of said plurality of electrical loads;
   a plurality of load control means, said load control means being spaced from one another and positioned at other locations spaced from said master controller means;
   each said load control means being connected to said serial data bus for receiving said command information;
   each of said load control means comprising:
      slave microcomputer means, including slave program means;
      a plurality of electrical load circuits associated with said microcomputer means;
      said slave microcomputer means for receiving said load command information in serial form transmitted by said master digital microcontroller means via said serial bus and processing said received command information, and said slave microcomputer means selectively providing power to respective ones of said plurality of electrical load circuits based upon the processed load command information.

2. The invention as defined in claim 1, wherein said master microcontroller means contains default load control information for each of said load control means; and wherein said master microcontroller means includes: second serial output means, and means for assembling and issuing a default load command information for each of said load control means in a serial bit stream via said second serial output means; and
   wherein each load control means further includes:
      means for extracting and holding said default load control information from said serial bit stream.

3. The invention as defined in claim 2, wherein said means for extracting and holding default load control information from said serial bit stream comprises shift register means; and
   means for connecting said shift register means of all said load control means into a daisy chain connected to said second serial output means of said master digital microcontroller means.

4. The invention as defined in claim 2, further comprising: second serial bus means; and
   wherein said means for extracting and holding load control information comprises serial to parallel shift register means, said shift register means including a register, a serial input, a serial output and a parallel output;
   said second serial bus means being coupled to said second serial output port of said master digital microcontroller means and a first of said shift register means for delivering said serial bit stream to a first shift register means; and
   daisy chain circuit means connecting a respective serial output of each of said shift register means to a respective serial input of the next adjacent shift register means in said plurality to form a daisy chain of shift registers.

5. The invention as defined in claim 1, wherein each of said load control means includes:
   shift register means;
   said shift register means including a serial input for receiving digital data input bits, an overflow serial output for outputting digital data bits, and a parallel output for outputting the contents temporarily stored in said shift register means, and clock input for receiving clock pulses to shift said shift register means, whereby digital bits appearing at said input are entered into said register means, bits in said shift register means are serially advanced in position in said shift register means from one stage therein to the next, and digital bits residing in said final stage of said shift register means are advanced out of said serial output at said overflow serial output in response to a clock pulse;
   wherein said master microcontroller means includes:
      second serial output means; and
      clocking means for producing clock pulses to clock out a serial digital data pattern from said second serial output means, one bit at a time;
      said master microcontroller means producing a serial bit pattern of digital information comprising a plurality of packets of information for registration of respective packets in corresponding ones of said shift register means with only one of said packets containing a code representative of the default load command information sent by said master microcontroller to the load control means containing said shift register means;
      clock bus means for connecting said clocking means in circuit with each of said shift register means to convey clock pulses to said clock input of each of said shift register means;

first lead means for coupling said second serial output means to a shift register means input of a first of said plurality of load control means;

daisy chain lead means for connecting said shift register output of each of said load control means, excepting a last one of said shift register means, to a shift register means serial input of one other load control means on a mutually exclusive basis to interconnect all said shift register means in a daisy chain circuit arrangement;

wherein digital information clocked from said second serial output means is paraded into said shift registers, and wherein said main microcontroller means clocks out a predetermined parade of digital bits to fill all of said shift registers, in response to a predetermined number of clock pulses issued by said main microcontroller means and wherein said digital bits stored thereby in the shift register of a selected one of said load control means selected by said master microcontroller means, upon cessation of said clock pulses, defines, at the parallel output of said selected shift register, a unique pattern of bits representative of said default load command information issued by said master microcontroller to said selected load control means via said serial bus.

6. The invention as defined in claim 5, wherein said parade of bits from said verification means comprises in number a number equal to the number of shift register means multiplied by the number of serial bits that said shift register means is capable of registering.

7. The invention as defined in claim 5 wherein each load control means further comprises a plurality of semiconductor power switch means for controlling power supplied to respective ones of said electrical load circuits in response to commands issued by said slave microcomputer means, the modular power controller further comprising:

a plurality of prioritizing means, one for each of said semiconductor power switch means; each of said prioritizing means having multiple inputs, with each input being ranked in level of priority from highest priority to lowest priority, and having an output;

said output of each said prioritizing means being connected to an input of a respective one of said semiconductor power switch means;

means for coupling the parallel output of said shift register means to the highest priority input of said prioritizing means in response to a default priority condition;

means connecting the output of said slave microcontroller means to the lowest priority input of said prioritizing means;

watchdog circuit means;

a plurality of gating means, each of said plurality of gating means being associated with a corresponding one of said plurality of semiconductor power switch means;

said watchdog circuit means having an input for receiving load commands issued by said slave microcomputer means and for producing a plurality of digital FALSE outputs responsive to receiving said load commands and producing a plurality of digital TRUE outputs in the absence of said load commands, said plurality of digital outputs corresponding in number to said plurality of gating means;

means coupling each output of said watchdog circuit means to a control input of a corresponding one of said gating means;

a plurality of monitoring means, one of each of said plurality of semiconductor power switch means; each said monitoring means associated with each of said semiconductor power switch means for producing an output representative of the current conducting state of the associated semiconductor power switch means;

means coupling the output of each said monitoring means to a second input of a corresponding of said gating means;

means coupling said output of said gating means to a greater priority input of said prioritizing means than said output of said slave microcontroller means and lower in priority than said priority input of said shift register means parallel output;

said gating means for outputting the respective input at said second input only in response to a TRUE input at the respective control input, whereby said watchdog circuit means maintains said semiconductor power switch means in its existing conductivity state upon the failure of said slave microcomputer means, overriding any commands thereafter from said slave microcomputer means, in the absence of a default condition and whereby said semiconductor power switch means is set into the default load configuration in response to a default load condition, irrespective of the outputs of either said watchdog circuit means and said slave microcontroller means.

8. The invention as defined in claim 1 wherein each load control means further comprises a plurality of semiconductor power switch means for controlling power supplied to respective ones of said electrical load circuits in response to commands issued by said slave microcomputer means, the modular power controller further comprising:

a plurality of prioritizing means, one for each of said semiconductor power switch means; each of said prioritizing means having multiple inputs, with each input being ranked in level of priority from highest priority to lowest priority, and having an output;

said output of each said prioritizing means being connected to an input of a respective one of said semiconductor power switch means;

means connecting the output of said slave microcontroller means to the lowest priority input of said prioritizing means;

watchdog circuit means;

a plurality of gating means, each of said plurality of gating means being associated with a corresponding one of said plurality of semiconductor power switch means;

said watchdog circuit means having an input for pulses issued by said slave microcomputer means and for producing a plurality of digital FALSE outputs responsive to receiving said load commands and producing a plurality of digital TRUE outputs in the absence of said pulses for a predetermined period of time, said plurality of digital outputs corresponding in number to said plurality of gating means;

means coupling each output of said watchdog circuit means to a control input of a corresponding one of said gating means;

a plurality of monitoring means, one for each of said plurality of semiconductor power switch means; each said monitoring means associated with each of said semiconductor power switch means for producing an output representative of the current conducting state of the associated semiconductor power switch means;

means coupling the output of each said monitoring means to a second input of a corresponding of said gating means;

means coupling said output of said gating means to a greater priority input of said prioritizing means than said output of said slave microcontroller means;

said gating means for outputting the respective input at said second input only in response to a TRUE input at the respective control input, whereby said watchdog circuit means maintains said semiconductor power switch means in its existing conductivity state upon the failure of said slave microcomputer means, overriding any commands thereafter from said slave microcomputer means.

9. The invention as defined in claim 1, further comprising:

arc extinguishing means associated with each electrical load circuit;

said arc extinguishing means comprising:

first semiconductor switch means having a control input and an output, said output being connected across said load circuit, said first semiconductor switch means being normally in a non-conductive state and switchable to an electrically conductive state, responsive to a TRUE input applied to said control input of said first semiconductor switch means;

current sensor means for monitoring current flow in said load circuit and providing an output indicative of current level;

second semiconductor switch means, having a control input and an output, said second semiconductor switch means being normally in an electrically conductive state and being switchable to an electrically non-conductive state responsive to a TRUE input applied to said control input of said second semiconductor switch means, said second semiconductor switch means being connected in series with said load circuit;

control circuit means for supplying a TRUE input to said control input of said second semiconductor switch means, responsive to said current sensor means output attaining a predetermined interrupt level;

means for inputting said current sensor means output to said respective slave microcomputer means, wherein said respective slave microcomputer means senses the level of said line current;

voltage sensing means for coupling said load circuit to said respective slave microcomputer means, wherein said respective slave microcomputer means senses the level of said line-voltage;

said slave microcomputer means including program means for detecting the simultaneous presence of low line voltage on said load circuit and a zero line current measured by said current sensor means and for providing a TRUE input to said first semiconductor switch means, whereby said first semiconductor switch means provides a conductive circuit across the lines of said load circuit.

10. The invention as defined in claim 9 further comprising:

analog to digital converter means for converting current levels sensed by said current sensor means and voltage levels sensed by said voltage monitoring means to digital form for respective input to said slave microcomputer means.

11. The invention as defined in claim 1 wherein each load control means further comprises a plurality of semiconductor power switch means for controlling power supplied to respective ones of said electrical load circuits in response to commands issued by said slave microcomputer means, the modular power controller further comprising:

verification means for verifying said load command information received at said load control means prior to selectively individually setting the electrical state of each of said associated semiconductor power switch means in accordance with said load control information.

12. The invention as defined in claim 11, wherein said master digital microcontroller means includes verification serial input means; and wherein said verification means comprises:

buffer means located at each load control means, each said buffer means for receiving and holding load command information from the associated slave microcontroller means;

register means for receiving a copy of said load command information;

means for copying said load command information into said buffer means;

and means for sending said copy of said load command information to said master digital controller means, wherein said master digital controller means verifies said load command information;

and means for outputting said load command information from said buffer means to said semiconductor power switch means, responsive to said master digital controller verifying said load command information.

13. The invention as defined in claim 1 wherein each load control means further comprises a plurality of semiconductor power switch means for controlling power supplied to respective ones of said electrical load circuits in response to commands issued by said slave microcomputer means, wherein said master digital microcontroller means includes a verification serial input, a strobe output and a clock output;

wherein said slave microcontroller includes a write command output; and wherein each said load control means further includes:

shift register means;

first latch means;

second latch means;

said first latch means having an input coupled to said output of said slave microcontroller means for receiving a copy of said load command information and outputting said load control information, responsive to a write command from said slave microcontroller means;

said second latch means having an output connected to said semiconductor power switch means and an input connected to an output of said first latch means for coupling load command information to said semiconductor power switch means, responsive to a strobe signal from said master digital controller means;

means for loading said shift register means with a copy of said load command information from said first latch means, responsive to a load signal from said master digital controller means;

means in said slave microcontroller for supplying a write command following output of said load command information, whereby said load command is entered in said first latch means;

means connecting said shift register means of each of said load control means in a serial chain to said verification serial input of said master microcontroller means, wherein a serial output of one said shift register means is connected to the serial input of the next shift register means in said chain, whereby a serial line of data containing load command information for each of said load control means is formed in response to said load signal from said master digital microcontroller means;

means in said master digital microcontroller means for supplying a load command to each of said power control means, whereby said shift register means are loaded with a copy of load command information;

means in said master microcontroller means for initiating said clock output to supply clock pulses to each of said shift register means, wherein said serial line of data is shifted into said master microcontroller means;

said master microcontroller means further including: means for comparing load command information received via said verification serial input means with the load command information previously sent to said slave microcontroller means via said serial data bus and, responsive to a match thereof, for providing a strobe output to said second latch means, whereby said load command information is entered into said semiconductor power switch means.

14. In a modular power controller of the type containing a controller card, a plurality of load cards and a backplane card in which each of said controller cards and load cards are interconnected in circuit by means of said backplane card, wherein said modular power controller selectively controls the supply of electrical power to a plurality of separate electrical loads, the improvement therein wherein said controller card issues command information selectively in serial digital form onto said backplane card for each of said load cards; and wherein each said load card includes a plurality of semiconductor power switches and an embedded microprocessor, said embedded microprocessor for receiving command information in serial form transmitted from said controller card via said backplane card, for interpreting and processing said received command information and for selectively controlling the electrical state of said semiconductor power switches associated therewith responsive to said interpreted processed received information, whereby each load card individually controls a plurality of electrical load circuits.

15. In a modular power controller of the type containing a controller card, a plurality of load cards and a backplane card in which each of said controller cards and load cards are interconnected in circuit by means of said backplane card, wherein said modular power controller selectively controls the supply of electrical power to a plurality of separate electrical loads, the improvement therein wherein said controller card issues command information selectively in serial digital form onto said backplane card for each of said load cards; and wherein each said load card includes a plurality of semiconductor power switches and an embedded microprocessor, said embedded microprocessor for receiving command information in serial form transmitted from said controller card via said backplane card, for interpreting and processing said received command information and for selectively controlling the electrical state of said semiconductor power switches associated therewith responsive to said interpreted processed received information, whereby each load card individually controls a plurality of electrical load circuits; and wherein said controller card contains a default command output for providing default command information; wherein each said load card contains a daisy chain input and a daisy chain output connected respectively to said backplane card; and wherein said backplane card includes circuit means for connecting said daisy chain input of a first one of said plurality of said load cards to a verify output of said controller card and for connecting said daisy chain input of each of said remaining load cards to said daisy chain output of the respective preceding load card in said daisy chain; and wherein each said load card further includes:

a plurality of prioritizing means, each said prioritizing means having at least two priority inputs for passing only the signal at the input having the highest priority, each of said plurality of prioritizing means being associated with a respective one of said plurality of semiconductor switch means on said load card;

semiconductor registering means for receiving said command information at said daisy chain input and passing said command information to said daisy chain output, wherein said command information is passed to the next successive load card in said daisy chain, and for outputting said received command information to a first input of each of said plurality of associated comparison means;

each said comparison means having a second of said inputs coupled to an output of said embedded microcontroller for receiving low level command information from said microcontroller;

and wherein each of said plurality of semiconductor switch means on said respective load card being responsive to a TRUE output from an associated one of comparison means for completing an electrical power transmission circuit.

16. The invention as defined in claim 15, wherein said controller card includes:

clock means for providing clock pulses;

clock bus means wired between said controller card and each of said load cards to provide verify clock pulses to each of said load cards;

and wherein said semiconductor verifying means comprises:

serial to parallel shift register means;
said shift register means having a serial input connected to said verify input of said load card; a clock input connected to said verify clock bus for shifting data into and serially advancing data through said shift register in response to clock pulses; a serial output connected to said verify output of said load card for outputting data bits shifted through said shift register responsive to successive clock pulses, and a parallel output for outputting the contents of said shift register in parallel form;

and wherein said parallel output of said shift register means is connected to said first input of said comparison means.

17. The invention as defined in claim 15, wherein said embedded microcontroller on each load card further includes means for compiling and transmitting a report of the electrical status of said load card in serial form via said backplane card to said controller card; and wherein said controller card includes means for receiving and assessing said electrical status information.

18. The invention as defined in claim 17, wherein said electrical includes status of electrical arcing.

19. The invention as defined in claim 15, further including latch circuit means for preventing change of state of said semiconductor switch means responsive to withdrawal of electrical power.

20. The invention as defined in claim 15 wherein said controller card includes microprocessor means, shadow microprocessor means, and means for detecting disablement of said microprocessor means, said shadow microprocessor means performing identical functions to said microprocessor means and providing output to replace output from said microprocessor means only in the event of detection of disablement of said microprocessor means.

21. The invention as defined in claim 20, further comprising:
first power source means for providing electrical to said microprocessor means; and back up power source means for providing alternate electrical power to said microprocessor means only in the event of failure of said first power supply means.

22. In a modular solid state power controller of the type containing:
a panel; said panel containing:
first coupling means for coupling to an external electrical power source,
second coupling means for coupling electrical power to a plurality of electrical loads and
input coupling means for receiving electrical data from an external source;
a first circuit board; said first circuit board containing a master digital microcontroller, said digital microcontroller having an input coupled to said input coupling means for receiving and processing said electrical data;
a plurality of slave circuit boards, each said slave circuit boards containing switching means for controlling the flow of electrical power in a respective plurality of electrical load circuits between an on and an off state;
a backplane circuit board; said backplane circuit board containing a plurality of electrical connector means, first electrical transmission paths for interconnecting signals from said master microcontroller and said slave circuit cards and second electrical transmission paths for interconnecting electrical power between said respective slave circuit boards and said second coupling means of said panel, said second electrical transmission paths comprising a plurality of individual transmission paths;
said panel, first circuit board and said slave circuit board being oriented in spaced parallel relationship and orthogonal to said backplane circuit board;
each of said first circuit board and said slave circuit boards containing electrical connector means for mating engagement with a mating electrical connector means on said backplane circuit board, wherein said first electrical transmission paths is connected amongst all said circuit boards and wherein said second electrical transmission path is connected amongst all said slave circuit boards and said second coupling means of said panel;
the improvement
wherein said power switching means comprises semiconductor switch means, said semiconductor switch means having a control input and being switchable between electrical conducting and non-conducting states in dependence upon a control signal applied to said control input;
wherein said master microcontroller means includes means for issuing command signals in serial digital form and applying same to said first electrical transmission path of said backplane circuit board responsive to said data information;
and wherein each of said slave circuit boards further contains slave microcontroller means having an output coupled to said control input of said semiconductor switch means for receiving said command signals in serial form via said first electrical transmission path and processing said command signals to low level command signals applied to said output for controlling the electrical state of said semiconductor switch means.

23. The invention as defined in claim 22, wherein said semiconductor switch means comprises a plurality of individual semiconductor switches; and wherein said output of said slave microcontroller means comprises a plurality of outputs with one output for each of said semiconductor switches, whereby said semiconductor switches are individually controlled by said slave microcontroller.

24. A power controller comprising:
master digital microcontroller means, including program means;
a plurality of N load control means, each load control means including a programmed digital slave microcomputer means; and a plurality of Y semiconductor power switches associated with said programmed digital microcomputer means, each of said semiconductor power switches being configurable between at least two modes of operation;
a serial data bus, said serial data bus coupled between said master digital microcontroller means and said N load control means to provide a digital communication path therebetween;
each said programmed digital slave microcomputer means having a communications port connected to said serial data bus;
said master digital microcontroller means containing load configuration information for each of said Y power semiconductor switches on each of said N load control means and address information for each of said N load control means, and having a first serial output for outputting addressed load configuration command information in digital serial form onto said serial data bus for communication to a respective addressed digital slave microcomputer in a selected load control means, whereby each of said N load control means selectively receives load configuration command information from said master microcontroller via said serial bus;
said master digital microcontroller means further having a second serial output;
a plurality of N serial to parallel shift registers, each having a serial input, a serial output and an inhibit input; each of said shift registers being associated with a corresponding one of said load control means;
daisy chain circuit means coupling said second serial output port of said master digital microcontroller means and said serial inputs and serial outputs of each of said N shift registers in a daisy chain, wherein digital bits outputted from said second serial output port is inputted into a first shift register means in said daisy chain and digital bits outputted from a serial output of one shift register means is inputted to the next shifter register means in said daisy chain;
said master microcontroller including program means for selectively assembling packets of load configuration information for each of said N load control means in the form of data bits and assembling the first through Nth packets of data bits in reverse serial order to form a stream of digital bits with the Nth packet for said Nth shift register means being arranged first in said stream and said 1st data packet for the 1st shift register means in said daisy chain arranged last in said stream and outputting said stream of bits from said second serial port, whereby each of said N shift register means respectively receives and registers specified load configuration information and outputs the registered load configuration information at its respective parallel output;

each said load control means, further including:

prioritizing gate means having a plurality of priority level inputs between at least first and second priority levels for outputting only the data present on the higher priority level input; said parallel output of said associated shift register means being connected to said first level priority input of said prioritizing gate means and load configuration command information from an output of said associated slave microcomputer means being connected to said second level priority input of said prioritizing gate means, whereby said Y semiconductor power switch means is set to the configuration specified by the load configuration command information from the higher level input.

25. The invention as defined in claim 24, further comprising:

selectively operable inhibit switch means for preventing additional inputs to said serial inputs of each of said shift register means to prevent change in load configuration information at the respective parallel output of each of said shift register means.

26. The invention as defined in claim 25, wherein said master microcontroller means includes a third output port; means for coupling said third serial input port to said shift register means output of said Nth shift register means; and wherein said master microcontroller includes program means for providing a predetermined number of digital bits at said second output of said master microcontroller means to parade load configuration information in said shift register means into said master microcontroller means and for comparing the load configuration information in said parade with load configuration information retained in said master microcontroller means.

27. A computerized arc extinguishing circuit for an electrical load circuit comprising:

arc extinguishing means associated with said electrical load circuit;

said arc extinguishing means comprising:

first semiconductor switch means having a control input a nd an output, said output being connected across said load circuit, said first semiconductor switch means being normally in a non-conductive state and switchable to an electrically conductive state, responsive to a TRUE input applied to said control input of said first semiconductor switch means;

current sensor means for monitoring current flow in said load circuit and providing an output indicative of current level;

second semiconductor switch means, having a control input and an output, said second semiconductor switch means being normally in an electrically conductive state and being switchable to an electrically non-conductive state responsive to a TRUE input applied to said control input of said second semiconductor switch means, said second semiconductor switch means being connected in series with said load circuit;

control circuit means for supplying a TRUE input to said control input of said second semiconductor switch means, responsive to said current sensor means output attaining a predetermined interrupt level;

microcomputer means, including program means for detecting the simultaneous presence of a low line voltage on said load circuit and a zero line current measured by said current sensor means and for providing a TRUE input to said first semiconductor switch means, whereby said first semiconductor switch means provides a conductive circuit across the lines of said load circuit;

means for inputting said current sensor means output to said microcomputer means, wherein said microcomputer means senses the level of said line current; and voltage sensing means for coupling said load circuit to said microcomputer means, wherein said microcomputer means senses the level of said line voltage.

28. The invention as defined in claim 27, further comprising:

analog to digital converter means for converting current levels sensed by said current sensor means and voltage levels sensed by said voltage monitoring means to digital form for respective input to said microcomputer means.

* * * * *